United States Patent [19]

Emmett, Jr. et al.

[11] Patent Number: 5,007,620
[45] Date of Patent: * Apr. 16, 1991

[54] APPARATUS FOR BIOLOGICAL PROCESSING OF METAL-CONTAINING ORES

[75] Inventors: Robert C. Emmett, Jr.; Lawrence T. O'Connor, both of Salt Lake City, Utah

[73] Assignee: Envirotech Corporation, Menlo Park, Calif.

[*] Notice: The portion of the term of this patent subsequent to Mar. 1, 2005 has been disclaimed.

[21] Appl. No.: 235,238

[22] Filed: Aug. 23, 1988

Related U.S. Application Data

[63] Continuation-in-part of Ser. No. 5,670, Jan. 21, 1987, which is a continuation-in-part of Ser. No. 827,324, Feb. 7, 1986, Pat. No. 4,732,608, and a continuation-in-part of Ser. No. 884,205, Jul. 10, 1986, Pat. No. 4,728,082.

[51] Int. Cl.$^5$ .............................................. C22B 3/02
[52] U.S. Cl. .................................. 266/168; 266/101; 75/743; 423/DIG. 17
[58] Field of Search ................................ 266/168, 101; 423/DIG. 17

[56] References Cited

U.S. PATENT DOCUMENTS

| | | | |
|---|---|---|---|
| 1,642,051 | 9/1927 | Wall | 261/122 |
| 2,718,275 | 9/1955 | Banks | 261/122 |
| 2,829,964 | 4/1958 | Zimmerley | 423/DIG. 17 |
| 3,336,016 | 8/1967 | Schreiber | 210/14 |
| 3,396,950 | 8/1968 | Wood | 261/122 |
| 3,433,629 | 3/1969 | Imai et al. | 423/DIG. 17 |
| 3,441,216 | 4/1969 | Good | 261/122 |
| 3,490,752 | 1/1970 | Danjes et al. | 210/220 |
| 3,495,712 | 2/1970 | Schreiber | 210/14 |
| 3,533,508 | 10/1970 | Siepp et al. | 210/195 |
| 3,537,583 | 11/1970 | Wahmer et al. | 210/195 |
| 3,642,260 | 2/1972 | Danjes et al. | 261/122 |
| 3,836,131 | 9/1974 | Beggs | 266/20 |
| 3,951,758 | 4/1976 | Porsch | 210/14 |
| 3,977,606 | 8/1976 | Wyss | 239/145 |
| 3,997,634 | 12/1976 | Downs | 261/122 |
| 4,007,240 | 2/1977 | Gosden | 261/122 |
| 4,046,845 | 9/1977 | Veeder | 261/122 |
| 4,243,616 | 1/1981 | Wyss | 261/122 |
| 4,440,644 | 4/1984 | Mudder | 210/611 |
| 4,461,834 | 7/1984 | Mudder | 435/253 |
| 4,468,327 | 8/1984 | Brown | 423/DIG. 17 |
| 4,497,778 | 12/1984 | Pooley | 423/DIG. 17 |
| 4,571,387 | 2/1986 | Bruynesteyn et al. | 75/101 R |
| 4,728,082 | 3/1988 | Emmett, Jr. et al. | 423/150 |
| 4,732,608 | 3/1988 | Emmett, Jr. et al. | 75/101 R |

FOREIGN PATENT DOCUMENTS

| | | |
|---|---|---|
| 45769 | 8/1985 | Australia . |
| 0004431 | 3/1979 | European Pat. Off. . |
| 8426854 | 11/1985 | Fed. Rep. of Germany . |
| 853701 | 5/1985 | South Africa . |
| 899119 | 5/1980 | U.S.S.R. . |
| 1359324 | 1/1982 | U.S.S.R. . |
| 824376 | 11/1959 | United Kingdom . |
| 2180829 | 9/1986 | United Kingdom . |

OTHER PUBLICATIONS

Article: "Ferrous Iron Oxidation and Uranium Extraction by Thiobacillus Ferrooxidans", by Roger Guay and Marvin Silver, Biotechnology and Bioengineering, vol. 19, pp. 727–740 (1977).

(List continued on next page.)

*Primary Examiner*—Jeffrey E. Russel
*Assistant Examiner*—Steven Bos
*Attorney, Agent, or Firm*—Trask, Britt & Rossa

[57] ABSTRACT

An apparatus for use in bioleach processing of metal-bearing solids is disclosed. The apparatus includes a containment means adapted for containing a slurry made up of metal-bearing solids, a predetermined quantity of water, oxygen, carbon dioxide, nutrients and a species of microorganisms capable of oxidizing some portion of the metal-bearing solids and obtaining energy for growth from that oxidation. The apparatus further includes a plurality of horizontally oriented porous, flexible membrane diffusers adapted for introducing oxygen into the bottom of the reactor vessel in the form of small widely dispersed bubbles.

11 Claims, 25 Drawing Sheets

OTHER PUBLICATIONS

Article: "Microbiological Mining", Scientific American, vol. 247(2), p. 44, 1982, Corale L. Brierly.

Article: Growth Kinetics of Thiobacillus Ferrooxidans Isolated from Arsenic Mine Drainage; Joan Forshaug Braddock, Huan V. Luong & Edward J. Brown, published in Applied and Environmental Microbiology, Jul. 1984, pp. 48–55.

Paper: "Continuous VAT Biooxidation of a Refractory Arsenical Sulphide Concentrate", presented at the 17th Canadian Mineral Processor's Conference on Jan. 22–24, 1985, by P. Brad Marchant.

Article: "A New Biotech Process for Refractory Gold-/Silver Concentrates", by R. P. Hackl, F. Wright, and A. Bruynesteyn.

Schematic Drawing of Schreiber Corporation, Inc. (Trussville, Ala.).

Use of Micro-Organisms for Recovery of Metals by O. H. Tuovinen & D. P. Kelley, International Metallurgical Reviews, Review 179, 1974, vol. 19, pp. 21–30.

Brochure: The Wilfley Weber Flotation Cell (with inserts) Denver, Colo.

Brochure: Wilfley Weber, Inc.

DORRCO Technical Manual, Section 32, "Agitator Slurry Mixer", Dec. 1951.

Brochure: Schreiber Counter Current Plants (Trussville, Ala.).

Brochure: Schreiber Counter Current Aeration Tank Models GR, GRZ, GRO and GRD (Trussville Ala.).

Brochure: Schreiber Counter Current Aeration (Trussville, Ala.).

APPARATUS FOR BIOLOGICAL PROCESSING OF METAL-CONTAINING ORES

RELATED APPLICATIONS

This application is a continuation-in-part of application Ser. No. 005,670, filed Jan. 21, 1987, which is a continuation-in-part of application Ser. No. 827,324, filed Feb. 7, 1986, now issued as U.S. Pat. No. 4,732,608 and application Ser. No. 884,204 filed July 10, 1986, now issued as U.S. Pat. No. 4,728,082, the disclosures of which are hereby incorporated by reference.

BACKGROUND OF THE INVENTION

1. Field

This invention relates to a process and attendant apparatus for use in processing metal-containing ores by use of a biological (hereinafter "bioleaching") technique. More particularly, this invention is directed toward a process and apparatus for use in processing precious metal-bearing pyrite ore concentrates which are not efficiently leachable by conventional processes and means, such as leaching using cyanide solutions.

2. State of the Art

Recent interest in the metallurgical field has focused on the use of special types of autotrophic bacteria, e.g. thiobacillus ferrooxidans and thiobacillus thiooxidans, in treating sulfide ores and concentrates. The use of such bacteria in heap leaching treatments to solubilize copper from low-grade ores has been known for several decades.

Currently, however, the interest in applying this biochemical technology has been focused on continuous processes to treat sulfide concentrates. These continuous processes either make the concentrates more susceptible to conventional cyanide leaching or actually extract the desired metal from the concentrate.

Particular attention has been focused on gold-bearing, silver-bearing, or platinum-bearing pyrites and arsenopyrites that are, at best, marginally susceptible to cyanide solution leaching. These concentrates' insusceptibility to cyanide leaching is due to the desired metals, e.g. gold or silver, being encapsulated by the pyrite crystal. The pyrite crystal is insufficiently porous to allow penetration of the cyanide solution for a metal-cyanide dissolution reaction to take place. Comminution of the metal-bearing pyrite, in itself, does not expose sufficient metal values to be economically feasible inasmuch as greatly increased cyanide solution and energy consumption are required. The above-described bacteria can, however, induce the biooxidation of sulfide and iron in the unsolubilized pyrite crystal, leaving the gold, silver or platinum intact. The resulting residue, after separation of the soluble biooxidation products, is amenable to metal extraction employing conventional cyanide, thiourea, or thiosulfate solution leaching techniques. On occasion, even a partial biooxidation of the metal-bearing pyrite by the above-described bacteria is sufficient to allow successful cyanide solution leaching of the resulting residue.

The described process is adaptable to the leaching of other metals. For example, chalcopyrite can be leached for its copper content, and zinc sulfides can be leached to produce zinc sulfate solutions ($ZnSO_4$). Other elements present as sulfides may also be solubilized, such as antimony and arsenic.

The current processes using the above-described bacteria for solubilizing the metal-bearing sulfide ores and concentrates are very energy intensive. The chemical reaction used by these bacteria is oxidation. Hence, oxygen transfer is a key step in the process.

Approximately an equal weight of oxygen is required to oxidize pyrite. The systems currently employed in the art require one horsepower hour per approximately 2.5 to 4 pounds of oxygen transferred into liquid phase. Consequently, to oxidize one ton (2,000 pounds) of concentrate, these systems consume approximately 400 to 600 kilowatt hours (KWH) of energy.

Metallurgical processing by leaching typically employs a number of tanks operating in series, each tank overflowing or cascading into a subsequent tank. The total retention time in the circuit (i.e., the series of tanks) is that required for processing. Reagents required for leaching are usually added to the first tank, and if necessary, to subsequent tanks. With bioleaching, there is a significant time required for bacterial growth to reach a level of suitable bioactivity. Simply adding bacteria to the first tank will not immediately provide sufficient numbers of microorganisms to achieve any great degree of processing. Furthermore, as the pulp flows from one tank to the next and the bioreaction continues, the amount of soluble by-product material produced can become very high. Soluble by-product material, e.g., metal sulphates, sulfuric acid, and arsenic acid, is a product of the bioleaching operation, which if present in the reaction tank in excessive proportion inhibits the speed of the reaction. Thus, without selective removal of this soluble by-product material, the reaction rate is diminished and the process is slowed.

One of the critical problems involved in developing a workable process is the transfer of nutrients and oxygen into the tanks in sufficient quantities so as to be readily assimilated by the bacteria. The bacteria require a supply of nitrogen, potassium, phosphorus and carbon dioxide as nutrients. These nutrients are typically provided by adding ammonium sulphate, potassium, phosphates and gaseous carbon dioxide to the tanks. Problems associated with transfer of the oxygen are distinguishable from those encountered providing nutrients and carbon dioxide. Since oxygen transfer is critical and the quantity required is very large, this part of the process is of paramount importance to overall process cost and performance. The method practiced conventionally involves injecting large quantities of oxygen directly into the solution and providing a mixing means whereby the oxygen is dispersed or distributed within the solution. These processes involve introducing the oxygen and transferring it from a gas phase into an aqueous phase, i.e., dissolving it within the solution.

The method conventionally adopted to effect this transition typically utilizes turbines which are placed within the slurry and rotated at high speeds. Though the turbine action does provide considerable mixing action, i.e., dispersion the oxygen, within the solution; the rotation of the turbines also produces cavitation effects. These effects cause the air bubbles within the solution to be forcedly aggregated into larger air masses or bubbles due to the vacuum effects and turbulence attendant the action of the turbine blades. Resultingly, the turbines, though functioning to disperse the air within the slurry, also function to create large air masses or bubbles which have a relatively small surface area to volume ratio. A basic problem confronting the conventional technology is the power requirement requisite to operate the turbines. The turbine power is that required to turn the blades at a sufficient velocity to achieve the desired quantity of oxygen being introduced into the aqueous phase of the solution. Oxygen in this phase may be readily assimilated by the bacteria. A considerable mixing action is required, necessitating a high tip speed on the turbine rotor blades. Understandably, this high tip speed is only obtained by an infusion of considerable quantities of energy into the turbine itself.

A second problem confronting the current technology is the removal of soluble by-product matter produced within the solution by the reactions effected or initiated by the presence of the bacteria. One typical approach to this problem is the use of a thickener. The slurry is admitted into the thickener and soluble components are removed via the overflow of the slurry/thickener mixture. This approach generally results in the bacteria, which are suspended within the liquid phase, being carried away together with the soluble matter, in the overflow. This removal of bacteria from the slurry slows the process reaction rate. Furthermore, the slurry thickener mixture is not aerated during the separation of the soluble material from the slurry. Therefore, the bacteria which remain with the solids are deprived of requisite oxygen and resultingly tend to slow their activity and further delimit the rate of the process.

A third major problem of the conventional process is the length of overall retention time required to achieve a desired extent of biooxidation. Systems currently employed require a retention time of many days. The retention time is inversely proportional to reaction rate, which is found to be enhanced by maximization of oxygen and nutrient supply. The reaction rate is delimited by the presence of reacted products and by-products in the reactor vessel and by the loss of biomass (i.e., microorganisms or bacteria) to the reactor effluent.

Failure of the current art to address effectively the above aspects of bioleaching has resulted in current bioreactors and processes being marginally efficient in both cost and process performance.

SUMMARY OF THE INVENTION

The reactor of the invention includes a containment means adapted for containing a slurry of metal-bearing solids. The containment means includes a bottom surface and an upstanding wall mounted in that bottom surface. An oxygen supply means, for introducing an oxygen-containing gas is mounted within the containment means. The supply means includes a plurality of diffusers which individually include a porous, flexible fabric membrane diffuser surface adapted to receive a supply of oxygen containing gas and introduce that gas in the form of bubbles into the slurry within the containment means. Each diffuser is positioned such that the face thereof is oriented substantially in a horizontal plane. Various diffuser configurations are disclosed. A preferred embodiment includes a planar diffuser face having a circular shaped perimeter. A second embodiment defines a planar diffuser face having a quadrilateral perimeter. A third embodiment utilizes a plurality of elongate tubular shaped diffusers arranged such that their respective longitudinal axes are oriented parallel to the horizon.

Various structural arrangements are contemplated for mounting the diffusers in the containment means. In one embodiment, a stationary framework is mounted within containment means to provide a fixed platform in which to mount the diffusers. In a second embodiment, the diffusers are mounted to a rotatable platform. In one construction, this rotatable platform includes an upright drive shaft located centrally within the containment means. A plurality of radially extending arms are mounted to the shaft. Individual diffusers are spacedly mounted on the arms. The shaft and its attendant arms is made rotatable about a vertical axis whereby gas dispersed from the plurality of diffusers is introduced into the slurry in a generally helix-shaped pattern. A gas transfer means for conveying pressurized gas (e.g., air) from an external supply to the individual diffusers is also contemplated within the scope of the invention.

A sweeping means, adapted for sweeping and otherwise scouring the bottom of the containment means may also be included in the invention. In those embodiments wherein the diffusers are mounted to a stationary platform, the sweeping means is especially important in that it operates to break up concentrations of solids which have settled out of the slurry onto the bottom of the containment means and thereby assists in precluding those concentrations from building up to the point where they cover over the stationary diffusers and hinder their proper operation.

An air lift suspension means may also be mounted on the containment means. The suspension means may be associated with the sweeping means whereby the suspension means may be used to resuspend the solids which have settled out of the slurry.

Whereas previous bioleach reactors have relied upon turbines and similar mechanical means to agitate the slurry and thereby retain the solids in suspension, the present reactor relies in large part on the agitation produced by the air/gas bubbles rising through the slurry to retain those solids in suspension. Given a sufficient diffuser area and quantity of air being introduced over that diffuser area, the invention achieves not only the requisite quantity of oxygen introduction into the slurry in a form which is assimilatable by the bacteria, but furthermore achieves a sufficient agitation of the slurry to retain the solids in suspension.

The air supply means of the invention generally involves the introduction of minute air bubbles near the bottom regions of the tank by a plurality of horizontally oriented membrane diffusers. In those embodiments wherein the diffusers are rotated within the containment means, the diffusers are configured to have a generally streamlined shape which may pass through the slurry with minimal drag and create a nominal amount of agitation and turbulence within the slurry. In preferred constructions, the diffusers are thin planar panels. The narrow width of the panel is directed into the slurry as the diffuser is rotated. In other words, the thin width of the panel constitutes the projected area or silhouette area for purposes of evaluating the drag on the diffuser. The diffusers are mounted on the arms and oriented to minimize any drag force on the diffuser as the arm rotates and drives the diffuser through the slurry. As the diffuser rotates, the slurry in close proximity to the diffuser flows over the membrane face of the diffuser. This slurry flow speed is sufficient that the particulates and liquid of the slurry act to scour and cleanse the slurry-exposed membrane face of the diffuser. This scouring and cleansing action reduces the tendency of the pores in the diffuser membrane face to plug. A plurality of diffusers may be mounted in spaced relationship along the length of each radial arm of the slurry mixer mechanism. The radial arms may be rotated about an essentially upright, vertical axis. The diffusers are thus rotated so as to distribute rising air bubbles effectively over a substantially horizontally oriented planar area of the lower regions of the tank. The arms are rotated at a fairly slow speed whereby each diffuser produces a generally spiral helix configuration of bubbles which rise through the slurry in the tank.

The number of individual diffusers employed and their location relative to each other are determined by the total amount of air required by the biooxidation occurring within the bioreactor. Further, the number and location of diffusers are determined by the oxygen transfer efficiency and capacity of the individual diffusers.

The diffusers may each include a horizontally mounted frame having a porous membrane fitted thereto. This membrane may be held in a substantially horizontal orientation by its mounting frame. The membrane includes a plurality of pores or orifices oriented such that the apparent air flow through these pores or orifices is outwardly through the membrane of the diffuser and substantially perpendicular to the slurry flow over the diffuser membrane surface. The diffusers are mounted on the radial arms of the slurry mixer so as to benefit from any local turbulence and cleansing action of the slurry in close proximity to the diffuser which is generated as the diffuser passes through the slurry. The pore size of the diffusers and the location of diffuser mountings on the radial arms of the slurry mixer mechanism are determined to produce optimally air bubbles having an approximate mean diameter of 4.5 millimeters or less. It is recognized that the finer the bubbles produced, the more readily is the oxygen contained therein, assimilatable by the bacteria.

The air supply means of the instant invention functions to achieve an enhanced surface area to volume ratio of the air bubbles introduced into the slurry. At the same, the supply means minimizes the opportunity and probability of aggregation of the various bubbles into larger masses of bubbles having a smaller surface area to volume ratio. In this manner, the instant invention achieves a greater assimilation condition or probability for the oxygen to be transferred into liquid solution or directly to the bacteria for purposes of assimilation and subsequent consumption in the biooxidation reaction. Further, the rotation of the radial arms effects a dispersion of the bubbles through the slurry with a minimal agitation of the slurry within the bioreactor vessel. This radial arm rotation methodology minimizes the energy consumption of the system as compared to the conventional turbine equipped systems. By minimizing the agitation the instant air supply means promotes the retention of the bacteria in contact with the suspended solids and thereby maintains the reaction rate.

The center shaft may be a large hollow pipe fitted with internal piping necessary to provide air to the radially-mounted mixer arms on which are mounted the diffusers. The selection of a hollow pipe permits the introduction of air from a supply located external to the tank. The hollow pipe is typically mounted with a lower, open end which communicates with the slurry. By this construction the slurry rises through the interior of the pipe, thereby surrounding the internal piping within the hollow pipe. Air may be injected into the hollow pipe through the internal piping and be channeled downwardly eventually being driven to the diffusers through the radial mixer arms positioned proximate the bottom of the tank.

Alternately, a solid center shaft may be employed. This alternative construction may include having the center shaft mounted on a foot or thrust bearing. An air conveying pipeline may be extended into a recess well defined within the portion of the shaft proximate its seating within the foot bearing. The recess well communicates with the mixer arms and the diffusers mounted thereon. The recess well includes a sealing means configured to retain air received within the well from escaping outwardly into the slurry except by passage through the mixer arms and their associated diffusers.

Additional internal piping may be provided in the hollow pipe for purposes of circulating fluids along the height of that pipe. This fluid circulation is directed toward the removal of heat generated within the reaction vessel, by the oxidation reactions occurring therein. The additional internal piping forms a heat exchanger by which cold fluids may be circulated through pipes whose external surfaces are in contact with the heat bearing slurry. Heat from the slurry is transferred through the walls of the piping and is thereafter transferred to the circulating cold fluid. Upon receiving that heat, the now heated fluid is directed away from the vessel to a disposal site.

Slurry may also be circulated from the lower portions of the tank, through the center shaft pipe, to radially-mounted riffle tubes at the upper end i.e., top of the tank. These riffle tubes may be used to enhance gravitation separation of high specific gravity solids, i.e. free gold, before the circulated slurry is returned to the general body of slurry in the tank. Slurry circulation across the riffle tubes is an energy efficient means of collecting free gold and other high specific gravity solids or deposits. The riffle tubes operate to prevent the accumulation of such solids or deposits on the bottom of the bioreactor tank. The riffle tubes are mounted to rotate with the center shaft about the central longitudinal axis of the reactor vessel. Each of the riffle tubes is fitted with a discharge port or spout for discharging the circulated slurry from the tube outward and onto the upper surface of the body of slurry. The discharge port is positioned above any contemplated slurry level. As a result the slurry being discharged from the tubes always falls downward onto the body of slurry. This falling motion together with the rotation of the tubes provides a downward flow of slurry which is distributed over a large portion of the upper surface of the body of slurry. This flow has the effect of suppressing any buildup of foam on the upper surface of the body of slurry.

In some constructions, the radial mixing arms are mounted to a collar which is slidably mounted on the center shaft. This collar, together with its attendant arms, is made slidable along the height of the center shaft. A lifting mechanism to mechanically raise and lower the radial mixing arms of the bioreactor may be provided to facilitate the cleaning of the mixing arms and the diffusers mounted thereon.

A vacuum filter may be mounted within the bioreactor tank to remove clear liquor containing dissolved products and by-products e.g. sulfuric acids and assorted salts from the vessel while leaving the bacteria and slurry solids within the vessel. Generally, this filtering involves the continuous or semi-continuous removal of a quantity of slurry from the general body of slurry. The unoxidized solids within this quantity of slurry are separated out by use of a cyclone. The unoxidized solids are then returned to the reactor vessel. The partially oxidized solids are separated from the slurry liquor and are directed to a second reactor vessel and subjected to further oxidation. The soluble by-products of the oxidation process, e.g. sulfuric acid and assorted salts, are directed to waste.

The process of the instant invention generally includes the steps of grinding the concentrate or ore; placing the concentrate or ore and other reactants, including a form of bacteria capable of oxidizing sulfide solids, e.g. thiobacillus ferrooxidans or thiobacillus thiooxidans in a primary bioreactor in such a way as to achieve a high rate of bioreaction; removing the soluble products, by-products and partially reacted solids; and directing the insoluble and partially reacted solids to a secondary bioreactor or series of bioreactors to allow for the completion of biooxidation, while returning any unoxidized solids to the primary bioreactor vessel.

Optimization of the overall biooxidation rate, thus minimizing solids residence time, equipment size, and cost, can be achieved only if the primary bioreactor is operated in such a manner so as to achieve the maximum consumption of oxygen, e.g. biooxidation rate, without attempting to control coincidentally the extent to which the concentrate or ore constituents are being oxidized while within the primary bioreactor.

The normally recognized biochemical oxidation reaction involves the dissolution of oxygen in water, followed by the bacterial assimilation of that dissolved oxygen. The bacteria e.g. thiobacillus thiooxidans or thiobacillus ferrooxidans, subsequently use the assimilated oxygen to oxidize biochemically the sulfide and iron species. The bacteria obtains energy for growth from oxidizing these species. In order for the bacteria to oxidize the iron it must be in a bivalent form ($Fe^{++}$), i.e. the ferrous form. The bacteria converts the iron to trivalent form ($Fe^{+++}$), i.e., the ferric form.

The bacteria may also oxidize a variety of sulfides, e.g. thiosulfate ion ($S_2O_3$—); the tetrathionate ion ($S_4O_6$—); soluble sulfides, i.e. those containing the sulfur ion $S$—; insoluble sulfides; and elemental sulphur. The end result is the production of a sulphate ion ($SO_4$—). This biooxidation is the essence of the bioleaching process.

In a bioreactor such as that of the instant invention, the bioreaction environment can be controlled such that oxygen transfer is also accomplished interfacially from a gas directly to the bacteria. In other words, oxygen transfer is effected without involving the otherwise reaction rate-limiting, oxygen dissolution step.

The secondary bioreactor or bioreactors of the process of the instant invention generally operate(s) at oxygen uptake rates similar to the bioreactors of the current art. However, since as much as 90% of the biooxidation occurs in the primary bioreactor, it is the primary bioreactor which is rate limiting. Thus, due to the enhanced efficiency of the primary bioreactor of the instant invention, the secondary bioreactor and the overall process requires much less time to achieve a desired extent of biooxidation.

The essence of the process of the instant invention is the control of the reaction environment within the bioreactors, particularly the primary reactor. The factors controlled in each bioreactor in the process of the instant invention include temperature, the rate and mechanism of oxygen input, the ratio of biomass (i.e. bacteria) to suspended solids, the ratio of reacted (i.e. inert) solids to unreacted solids, the concentration of soluble species generated as products or by-products, and the concentration of carbon dioxide and nutrients provided for bacterial growth.

Since the biooxidation reaction produces heat, a mechanism for heat removal may be provided as part of the process. Oxygen supply in the form of very small bubbles of sufficient number to sustain the bacteria is, if insufficient, the limiting factor on overall rate of the process. Both temperature control and oxygen supply are factors governed by the mechanical design of the bioreactor.

Maintaining the optimum ratio of biomass to reacted solids and the optimum ratio of reacted solids to unreacted solids is a task requiring the use of equipment ancillary to the bioreactor. A quantity of slurry is continuously or semi-continuously withdrawn from the reactor vessel and processed by this ancillary equipment. Reacted and partially oxidized solids can be separated from unreacted, unoxidized solids by the use of a selective centrifugal force separation in a cyclone, centrifuge, or alternatively a gravity settling device (e.g., a hydro-separator). The separation employs the differences in particle size or relative density, i.e. specific gravity, of the feed and product solids, allowing the more rapid settling of the larger and more dense sulfide, i.e. unreacted unoxidized solids as compared to the less dense oxidized and partially oxidized solids. Selective flocculation or agglomeration of these species may also be employed to enhance the efficiency of their separation.

Soluble by-product constituents in the reaction slurry act to limit the rate of bioreaction. The control of soluble by-product constituents in the reaction slurry may be achieved by the removal of suspended solids-free liquor from the slurry while retaining the bacteria within the slurry. This is achieved by a filtration mechanism internal to the bioreactor or a separation of liquid and solids by the use of a cyclone, centrifuge, or clarifier. Flocculation of all the suspended solids will enhance the solids-liquid separation. The clarified filtrate or overflow is removed from the system, while all captured solids are recycled to the bioreactor.

It is desirable for the process of this invention that biomass, i.e. bacteria, be maintained at as high a number level as possible in each bioreactor. The concentrate or ore feed, oxygen, carbon dioxide, and nutrients provide an environment for bacteria to grow and increase in number. Whatever bacteria leave the bioreactor thus leave only in combination with product, i.e. reacted, suspended solids, to which they are physically attached. Mechanisms for the removal of soluble constituents and liquors are designed so as to not remove bacteria coincidentally.

DESCRIPTION OF THE ILLUSTRATED EMBODIMENTS

Figure 1:
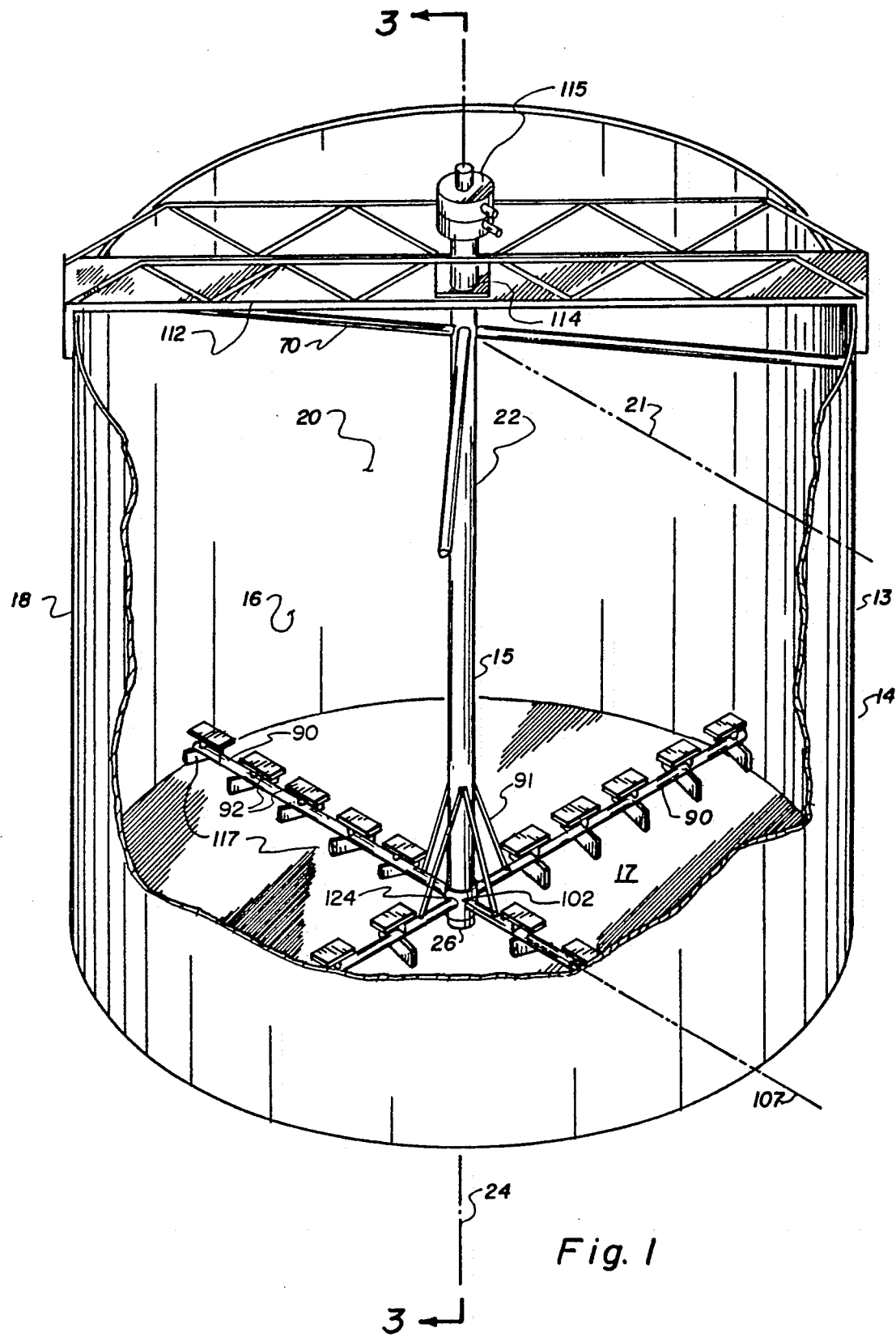
FIG. 1 is an elevated perspective view of the bioreactor vessel of the instant invention including a cut-away portion which reveals a centrally positioned support member fixedly mounted with a plurality of rotating, radially extending arm-like members positioned about the lower regions of that support member.

As shown in FIG. 1, a bioreactor vessel, generally 13, of the instant invention includes an open-ended tank 14 having suspended therein an air supply means generally 15 adapted to inject air received from a source exterior of the tank 14 into a liquid medium, generally 16, which is contained within the tank.

The tank 14 consists generally of a bottom member 17 which is fixedly and sealingly mounted with an upstanding vertical sidewall or sidewalls 18. As shown, the bottom member 17 may be substantially planar and circular in plan view. The upstanding vertical walls 18 may be a single tubular-shaped wall, whereby the tank obtains a substantially cylindrical configuration having an open port or end 20. In a preferred embodiment, the vertical walls 18 define a tank diameter 21 which remains constant over the height of the tank. The upright walls 18 and the bottom planar member 17 are fabricated from materials which are chemically resistant to the solids, slurry or by-products which may be housed within the tank. Materials such as stainless steel are generally used in constructing the tank. The height of walls 18 is preferably of sufficient dimension to permit a storage of a fluid (slurry), within tank 14, having a depth of at least twelve (12) feet.

Positioned within the tank is an air supply means 15. As shown, this supply means may include an elongate tubular support shaft 22 which may be positioned centrally and upright vertically within the tank 14. Shaft 22 includes a longitudinal axis 24 which is oriented substantially upright and which furthermore passes through, or may be co-linear to, the longitudinal axis 26 of the tank 14. The support shaft 22 may be structurally configured in a variety of shapes. As shown, the support means may be a substantially cylindrical, hollow tubular pipe member which extends from an elevation which is above any anticipated liquid level 27, to be obtained within the tank 14, downwardly to an elevation proximate the bottom plate 17 of the tank.

Figure 4:
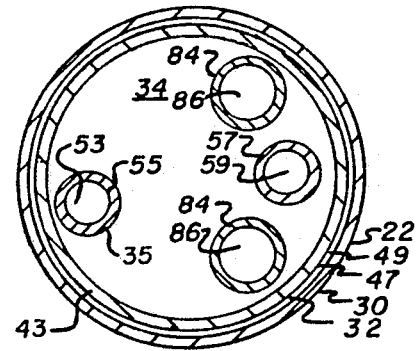
FIG. 4 is a cross-sectional view taken of the support member of the bioreactor vessel shown in FIG. 1 taken along sectional lines 4—4.
Figure 3:
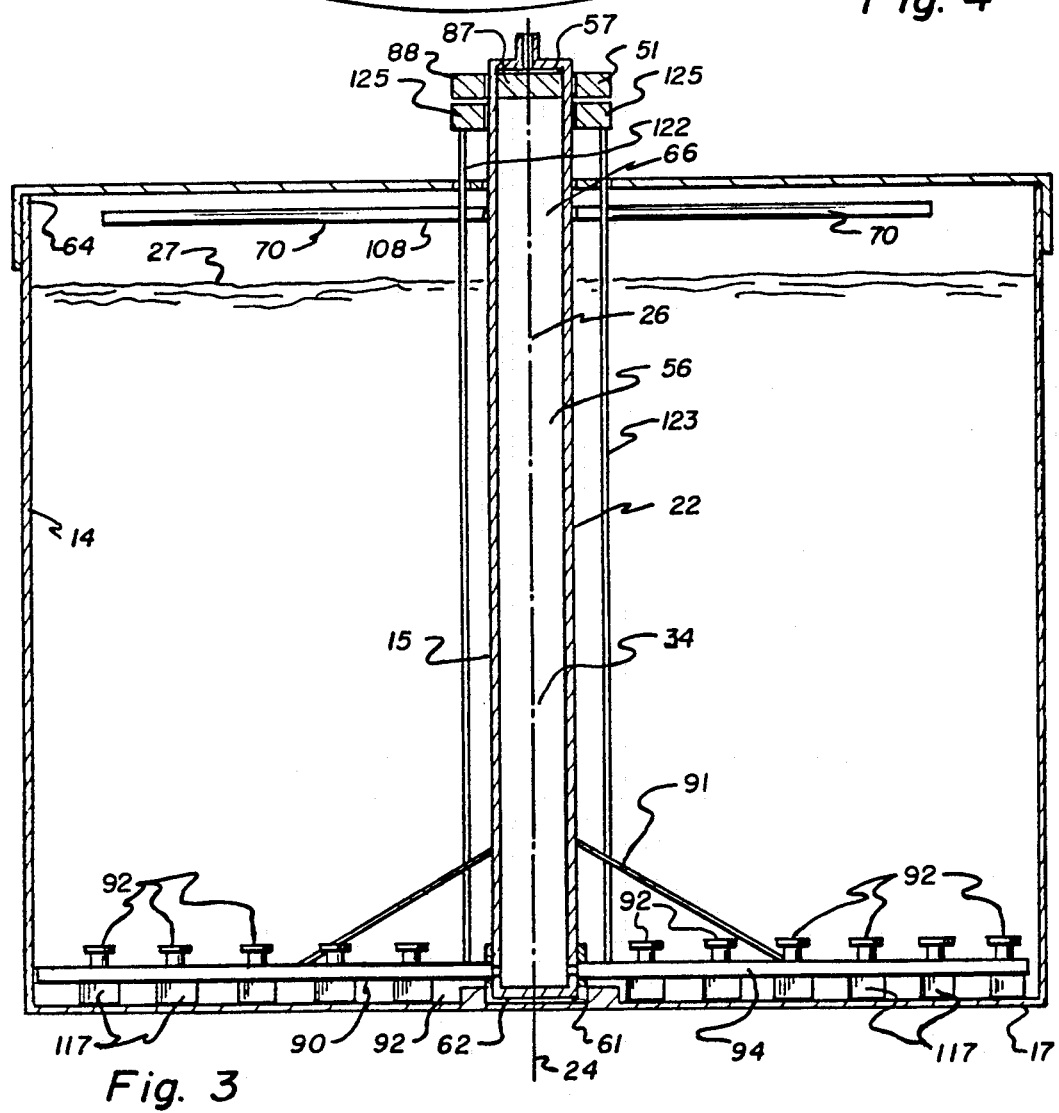
FIG. 3 is a cross-sectional view of the bioreactor vessel shown in FIG. 1.

Support shaft 22, as shown in FIG. 4, may include an exterior wall 30 and an interior wall 32. Interior wall 32 defines an interior cylindrical channel 34. Channel 34 provides a location for the positioning of a plurality of cylindrical tubular pipes, generally 35.

The oxidation and reduction processes accomplished within the reactor vessel are exothermic in nature. The instant invention contemplates a heat transfer mechanism whereby heat produced within the slurry contained in the reactor vessel may be dissipated or removed from the reactor vessel.

As shown, in a preferred construction a second tubular, cylindrical pipe member 43 is positioned within shaft 22. Tubular pipe member 43 is substantially similar in configuration to shaft 22 and further shares the same longitudinal axis 24. A first channel 49 is defined by the interior wall 32 of shaft 22 and the exterior face 47 of tubular pipe member 43. Channel 49 is substantially annular in cross-section. Channel 49 extends along the height of shaft 22. Channel 49 communicates with a supply means 51 positioned on the upper end 41 of shaft 22. Supply means 51 is adapted to supply a pressurized flow of fluid to channel 49.

Channel 49 receives that fluid and directs it downwardly along the length of the channel 49.

The fluid, e.g. water, flows along the surface interior walls 32 and acts to absorb heat from shaft 22 and pipe member 43. The described heat is that which is generated within the container-retained slurry 16 due to the oxidation reactions occurring therein. Upon the fluid reaching the end of channel 49, proximate the bottom 17 of the tank, the fluid is directed into a channel 53 defined by a tubular pipe member 55 housed within shaft 22. The heat-laden fluid, being under pressure, is thereafter driven upwardly through channel 53 until reaching a location proximate the upper reaches of shaft 22. Since the slurry within channel 34 contacts the exterior surface of pipe 55, the fluid in channel 53 also absorbs heat from slurry within the channel 34. A discharge means (not shown) is connected to tubular pipe member 55 and operates to receive the heat-laden fluid from the channel 49 and dispose of same. The arrangement of channel 49, together with pipe 55, supply means 51, and the discharge means, forms the heat exchanger adapted to remove heat generated by the exothermic reactions occurring within the tank 14. Heat may also be removed from the slurry by the air introduced into the vessel by air supply means 15, i.e., the air injected into the slurry 16 may be of a sufficiently low temperature and humidity that as it rises through the slurry, after its introduction therein, it absorbs heat from the slurry and conveys that heat upwardly eventually discharging it to the environment upon the air bubble breaking the surface of the slurry. Alternately, the heat exchanger may include fluid conducting coils positioned within the reactor vessel, e.g. about the walls 18 of the reactor vessel. Heat is removed from the vessel so as to maintain a slurry temperature within the range of 30° C. to 36° C.

A pipe 57 positioned within channel 34 of shaft 22 defines an interior channel 59. Channel 59 is used to receive a pressurized supply of air or oxygen-containing gas from a source (not shown) exterior to the tank 14. The channel 59 directs that air down to the lower regions of the support shaft 22. The air is thereafter introduced into the slurry extant within channel 34 for purposes of air lift suspension of the slurry and the particulates (solids) within the slurry itself.

Figure 10:
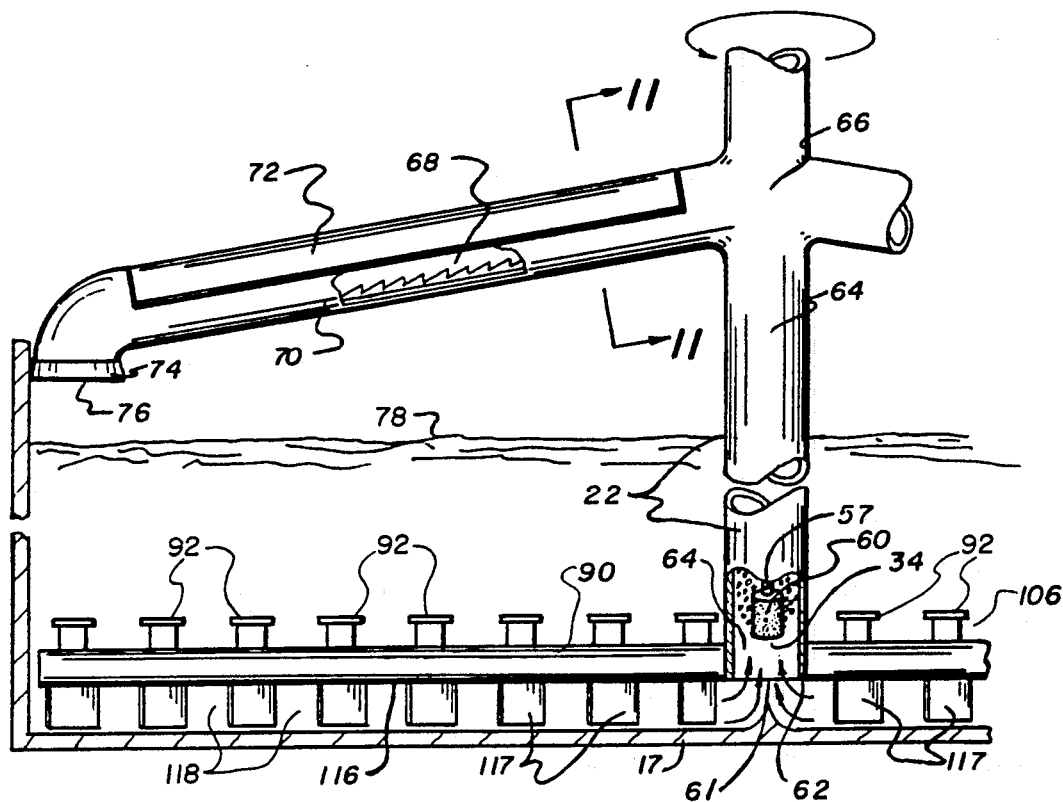
FIG. 10 is a side view of the riffle tube arrangement as found in the bioreactor vessel illustrated in FIG. 1.

As shown in FIG. 10, pipe 57 extends to a location proximate the bottom 17 of tank 14. The pipe 57 may be fitted on its end with a diffuser 60. Diffuser 60 may be constructed from a rigid frame having a porous, flexible fabric stretched over that frame. Air is received, under pressure within a hollow chamber defined within the diffuser and driven outward through the diffuser faric into the slurry. As illustrated, air is injected through diffuser 60 into the channel 34. Channel 34 communicates with the slurry 16 within the tank 14 by means of an access port 61. Access port 61 is defined by the open end 62 of shaft 22 which is positioned above and out of contact with bottom member 17 of tank 14. As air is injected into the interior of channel 34, a portion 64 of the slurry 16 contained within the channel 34 is driven upwardly along channel 34. Upon reaching the region 66 of channel 34, the slurry portion 64 is directed through a plurality of channels 68, i.e., channels 68 communicate with channel 34. Each channel 68 is defined respectively by a hollow riffle tube 70 which is fixedly mounted to shaft 22.

As shown in FIG. 10, each riffle tube 70 includes a substantially cylindrical housing 72 which extends radially from shaft 22. Each riffle tube 70 is fitted at its end 74 with a discharge port 76. The slurry proceeds along the length of tube 70 and is eventually discharged from tube 70 through port 76. Port 76 directs the slurry downward. The slurry, in being discharged from the riffle tubes 70, impacts against the upper surface 78 of the slurry 16 contained within the tank 14. This impact or discharge of the riffle tube-contained slurry functions to break down foam formations produced on the slurry surface 78 due to the reactions and turbulence within the slurry 16. Since the riffle tubes are rotated about the axis 24 of shaft 22, the riffle tubes operate to discharge air lifted slurry over a substantially circular pattern about the surface 78 of slurry 16.

The length of each of the riffle tubes 70 may be varied such that the plurality of tubes provides a series of concentric circular discharge paths over the surface of the slurry. In other words, each of the riffle tubes may be dimensioned to discharge slurry along a unique and distinctive circular path on the upper surface of the body of slurry, i.e. each path has a distinctive and unique radius.

Each riffle tube 70 is fitted with a sawtooth floor structure 80 mounted on the interior wall 82 of the tube 70, i.e., on the floor 83 of the interior of tube 70. These sawtooth structures function to trap solids, e.g. free gold, silver, or other precious metals having high specific gravities, e.g., above six (6), which are contained within the slurry flow being directed through the riffle tubes 70. The principles made operative in the use of these sawtooth structures are essentially those employed in a conventional sluicing operation.

Figure 11:
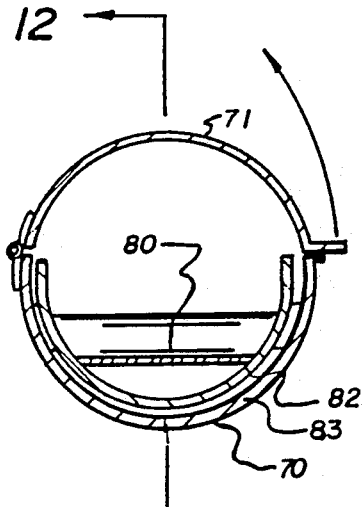
FIG. 11 is a cross-sectional view of the riffle tube arrangement illustrated in FIG. 10 taken along sectional lines 11—11.
Figure 12:
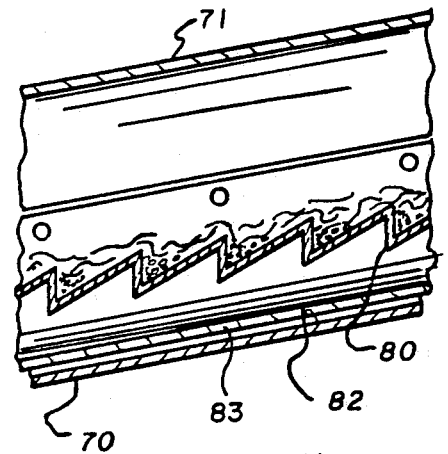
FIG. 12 is a cross-sectional view of the riffle tube arrangement shown in FIG. 11, taken along sectional lines 12—12.
Figures 13, 14:
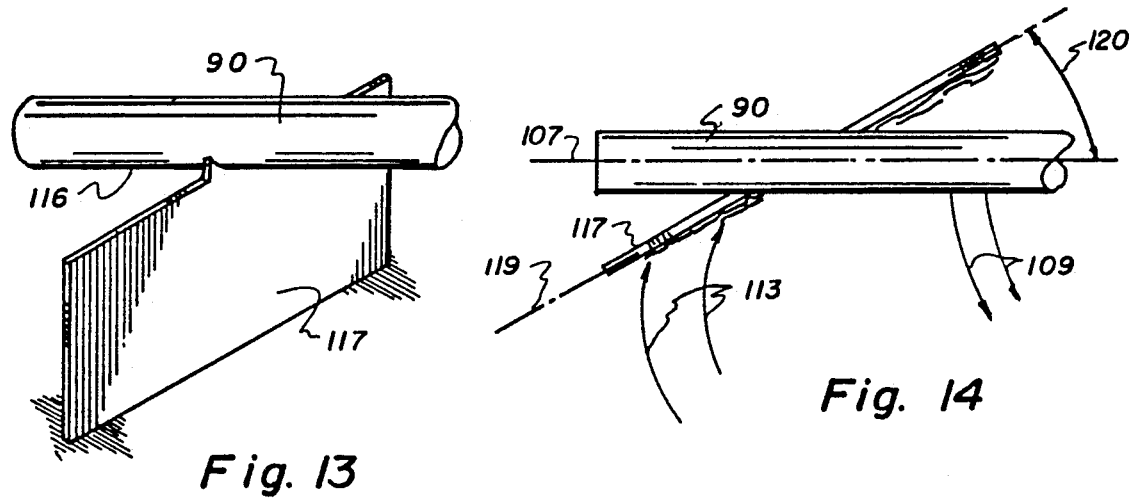
FIG. 13 is an elevated perspective view of a rake-like extension.
FIG. 14 is a top view of the rake-like extension shown in FIG. 13 illustrating the positioning of the extension vis-a-vis its support arm.
Figure 15:
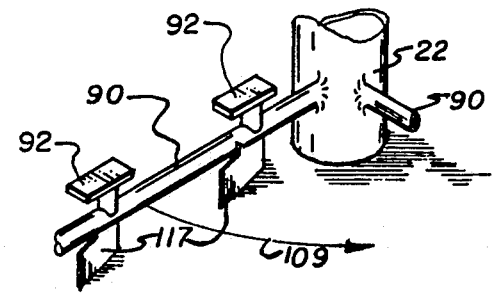
FIG. 15 is an elevational perspective view of the diffuser and rake-like extension mountings on a support arm.

As shown in FIG. 11, the upper portion of each riffle tube 70 is fitted with a manually openable hinged door 71 adapted for permitting the user to access the channel-housed sawtooth structures 80 for purposes of removing the trapped solids.

Figure 36:
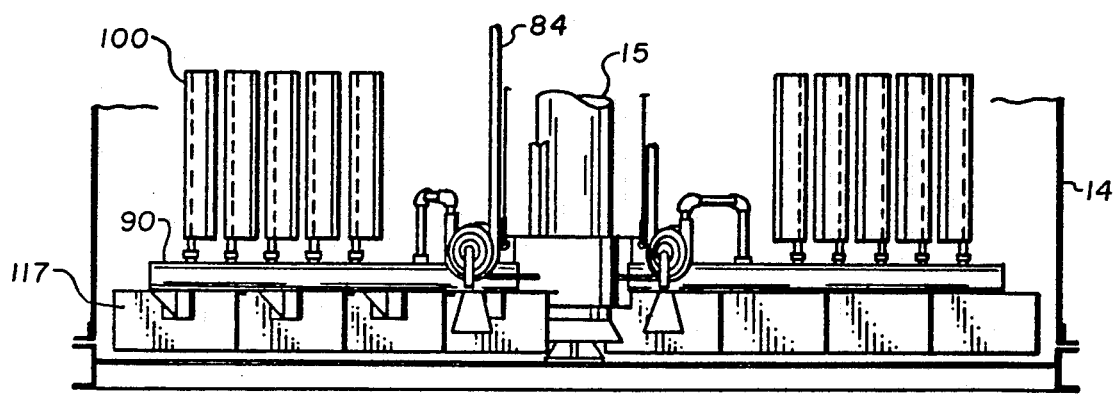
FIG. 36 is a side view of an alternative air supply means for the reactor vessel of this invention.
Figure 37:
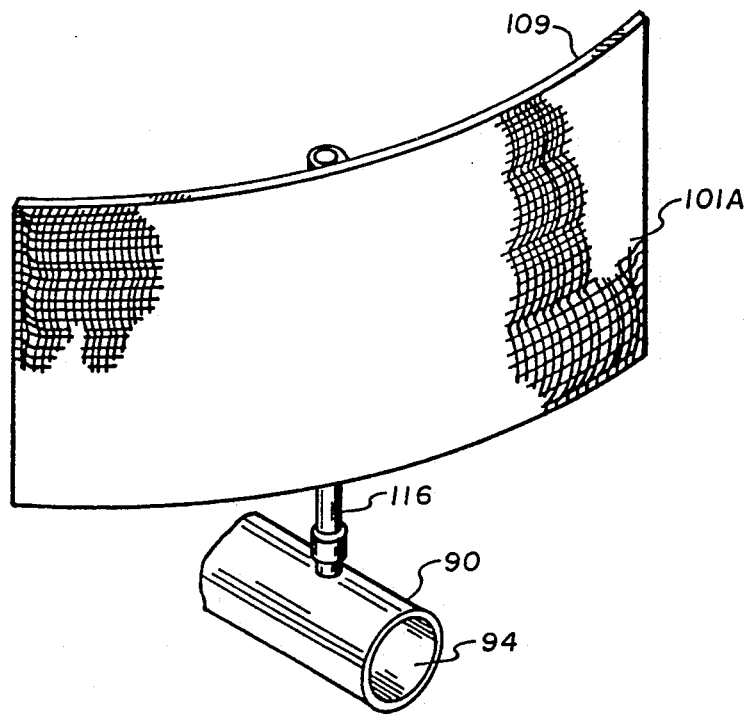
FIG. 37 is a perspective view of a third diffuser structure of the instant invention.
Figure 38:
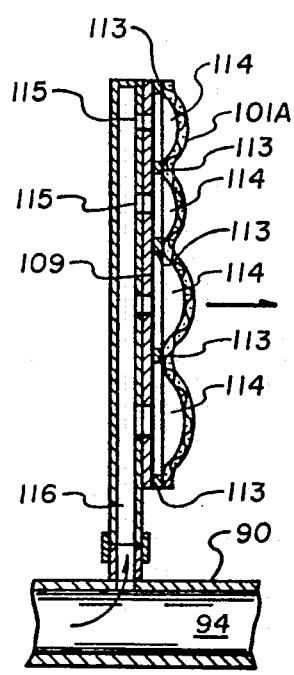
FIG. 38 is a cross-sectional side view of the diffuser shown in FIG. 37.

As shown in FIG. 4, within channel 34 are positioned a pair of cylindrical, tubular pipe members 84 defining a pair of interior channels 86. In an alternate construction as shown in FIG. 36 these pipes 84 and channels 86 may be external to shaft 22.

Pipes 84 extend from a supply means 88 positioned proximate the end 87 of shaft 22 downwardly through channel 34 to a location proximate the location of a plurality of radially extending arms 90. Supply means 88 is adapted to provide a supply of oxygen-containing gas, under pressure, to channels 86 and force that gas along the length of those channels 86. Channels 86 communicate at their ends with one or more channels 91 defined, respectively, within the interior of each radially extending arm 90.

Each radial arm 90 extends essentially perpendicular outwardly i.e. radially, from the support shaft 22 and is dimensioned to extend to a location proximate the wall 18 of the tank 14. Each radial arm 90 may be supported by a support arm 91 which extends from the shaft 22 outwardly and is fixedly mounted on the radial arm 90.

As shown in FIG. 1, each radial arm 90 is fitted with a plurality of diffusers 92 which communicate with the interior channel 94. Air is driven downward through channel 86 and directed into the interior channel 94 housed within each radial arm 90. Thereafter, the air is directed through the diffusers 92, thereby permitting the oxygen or air to be directed upwardly and outwardly into the slurry 16 residing within the tank 14.

In preferred embodiments, the diffusers 92 each include a permeable, replaceable membrane 93 having a hydrophobic outer surface. The membrane 93 defines a plurality of extremely small pores or orifices therein preferably having mean diameters of ten (10) microns or less. In a preferred construction, the membrane 93 is fabricated from a nylon, polypropylene, or polyester fabric having a sealant film, e.g., urethane acrylic co-polymer or polytetrafluoroethylene, applied or laminated thereon. Suitable membrane materials may include those available commercially under such trademarks as GORETEX, TYVEK, VERSAPOR and ENTRANT. Alternatively, a porous fabric manufactured by Gummi Jager of West Germany may also be used. The membrane 93 is held within a rigid frame structure 94 which retains the membrane 93 in a selected relationship with its respective rotating arm 90.

In the embodiment of FIG. 1, each diffuser 92 defines a substantially planar quadrilaterally perimetered diffuser surface which is oriented generally horizontally. Each diffuser 92 of this configuration is shown more detailedly in FIGS. 19 and 20. Each diffuser includes a frame 94 which retains a quadrilaterally shaped flexible membrane 93. The frame 94 is mounted to a air inlet conduit 95 which communicates with a hollow air conveying channel 96 defined within the radial arm 90. As shown in FIG. 1, the diffusers 92 are arranged such that the longitudinal axis 97 of each diffuser 92 is oriented parallel to the longitudinal axis 98 of its respective radial arm 90. This particular orientation is only one of many possible orientations. The principal requisite of the invention is the orientation of the diffuser surface, as defined by the membrane 93, in a horizontal orientation. Whether the longitudinal axis of a quadrilaterally configured diffuser surface is oriented parallel, perpendicular or otherwise transverse of the longitudinal axis of the radial arm 90 is not of serious consequence.

Figure 2:
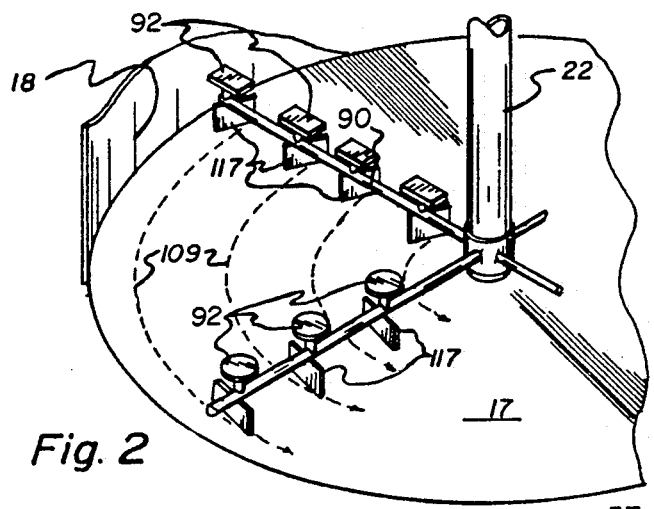
FIG. 2 is an elevated perspective view of the lower portion of the support member shown in FIG. 1. Two diffuser configurations are illustrated.
Figure 8:
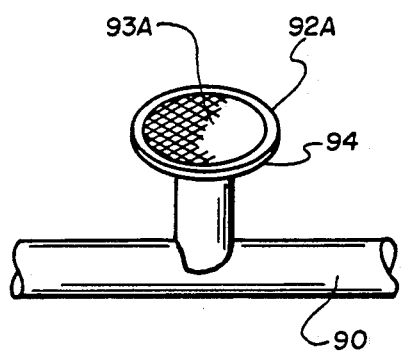
FIG. 8 is an elevational perspective view of one diffuser structure of the invention.
Figure 9:
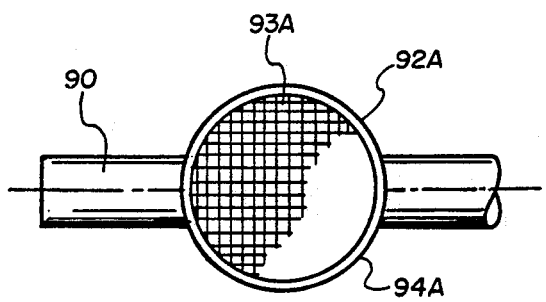
FIG. 9 is a top view of the diffuser shown in FIG. 8.

FIGS. 2, 8 and 9 illustrate a second embodiment of a diffuser, generally 92A. As shown, the frame 94A is configured to retain a circular shaped flexible membrane 93A. The frame 94A is mounted to an air inlet conduit 95A which in turn is mounted as an communicates with the air conveying channel 96A of radial arm 90.

Figure 16:
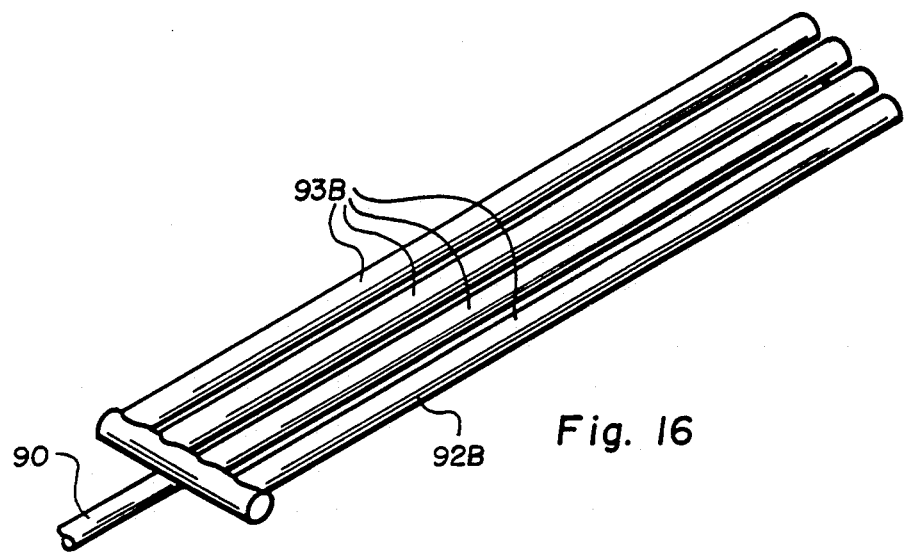
FIG. 16 is a perspective view of an alternative diffuser structure adapted for mounting on a radial mixing arm.
Figure 17:
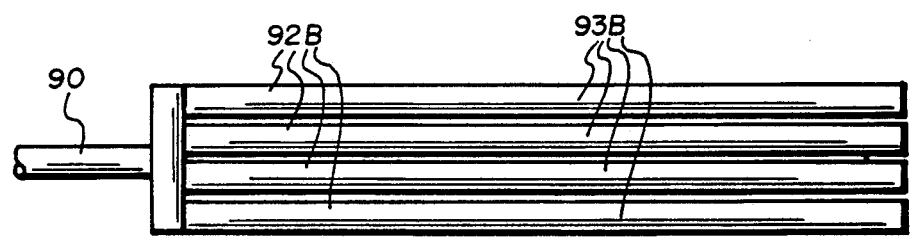
FIG. 17 is a top view of the diffuser shown in FIG. 16.
Figure 18:
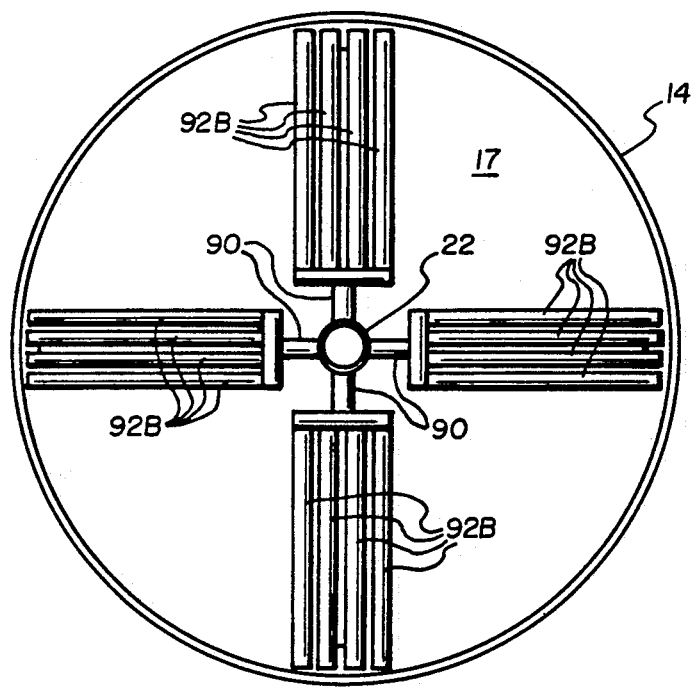
FIG. 18 is a top view of the containment vessel of the invention illustrating a plurality of the diffuser structures shown in FIGS. 16 and 17 rotatably arranged in a radial arrangement within the containment vessel.

FIGS. 16-18 illustrate a third diffuser embodiment generally 92B. In this construction, each diffuser 92B is formed in the shape of a right cylinder. A porous, flexible membrane 93B forms the sidewall of each cylinder. The ends of the cylinder may be formed by the support frame. Alternatively, they also may be covered by the porous flexible membrane 93B. The membrane 93B is retained in place by a skeletal rigid frame 94B.

As shown in FIGS. 16-18, a plurality of diffusers 92B, each having a longitudinal axis 97B, are positioned side by side, the respective axis 97B of each diffuser 92B being oriented parallel to the other diffusers and furthermore parallel to the longitudinal axis of the radial arm 90. The diffusers are mounted to and retained in position by an air inlet conduit, i.e. manifold 95B, which communicates with the air conveying channel 96 defined within the radial arm 90. As shown, the diffusers 92B may be dimensioned to extend from proximate the central shaft 15 outward to proximate the tank sidewall 14.

As shown in FIG. 9, the rotating arm 90 typically rotates in a counter-clockwise direction (shown by arrows 109) about the central longitudinal axis 24 of shaft 22. Given this rotation, slurry flows in a direction generally shown by arrows 113 along the face of the diffuser membrane 93, thereby accomplishing the scouring function.

The pores of the diffuser are dimensioned such that in operation the diffusers 92 preferably produce air bubbles having a mean diameter less than approximately 4.5 millimeters.

Each diffuser frame 94 may include a solid back wall and a plurality of upstanding sidewalls positioned on the back wall 108 and extending outwardly therefrom to form an open-box-like arrangement. Alternatively, opposing sides of the diffuser structure may be fitted with the porous flexible membrane.

The diffuser 92 includes a permeable replaceable membrane 93 which is fitted over the open end of each of the frames. The membrane is sealingly adhered to the sidewalls whereby the frame 94 is sealed and rendered air-tight. Membrane 93 defines a plurality of pores or orifices therethrough.

As air is directed under pressure into the frame 94, those portions of the membrane which are not adhered to the back plate or sidewalls tend to bow outward. This bowing action enlarges the fabric as well as the air receiving chamber defined within the frame 94.

The following table lists a few of the preferred materials together with test results obtained from utilizing those materials as a membrane in actual operation within a slurry and bacteria filled reactor vessel.

TABLE 1

| Diffuser Type | Required Air Rate $M^3$/hr. | Average Pressure Drop, Bar | Reactor Dissolved Oxygen Conc. Mg/L | Useful Life Days |
| --- | --- | --- | --- | --- |
| Elastox Perforated Rubber | .33 | .25 | 1–1.2 | >60 |
| Tyvek 1042 | .12 | .65 | 3–3.5 | 10 |
| Versapore 0.25 micron pore size | .13 | .65 | 3–3.5 | 7 |
| Porex sintered, porous plastic | .65 | .55 | .5 | 8 |
| Wilfley-Weber | .25 | .55 | 2–3 | 20 |

TABLE 1-continued

| Diffuser Type | Required Air Rate M³/hr. | Average Pressure Drop, Bar | Reactor Dissolved Oxygen Conc. Mg/L | Useful Life Days |
|---|---|---|---|---|
| Porous Ceramic 15 micron pore size Wilfley-Weber | .15 | 1 | 3–3.5 | 20 |
| Porous Ceramic 6 micron pore size | | | | |
| Polypropylene Felt, (Filter Media) | .25 | .55 | 2–3 | 10 |
| Polypropylene Felt (Silicone Treated) | .25 | .55 | 2–3 | 30 |

The "useful life" is defined as that period of time which elapsed from the initiation of the test until the membrane was rendered ineffective due to clogging or damage incident to infestation by the bacteria.

The table indicates the rate of air required to be diffused through the membrane in order to achieve an O2 transfer rate of 200–300 mg/l/hr. to supply an equivalent uptake rate by the bacteria. The $O_2$ uptake rate is a measurement commonly used in biological waste treatment. It reflects the rate of utilization of the oxygen within the slurry of the reactor vessel and is therefore a direct measure of biological activity. It should be understood that the oxygen transfer rate takes into consideration the form, i.e., bubble size, of the oxygen being introduced into the slurry. For example, a given quantity or mass of oxygen may be introduced into the slurry in either the form of large bubbles or in the form of fine bubbles. The oxygen in fine bubbles is more rapidly dissolved in the aqueous medium from which it can be assimilated by the bacteria. Therefore, notwithstanding the fact that equal quantities of air would be introduced into the slurry in both methods, the $O_2$ transfer rate would not necessarily be equal for the large and fine bubble methods. Instead, the fine bubble method would have a higher $O_2$ transfer rate, with more oxygen being supplied to the slurry in an assimilatable form from the same volume of air. Therefore, a larger portion of that $O_2$ could be assimilated by the bacteria before the bubbles reached the surface of the slurry and were discharged into the environment. With reference to Table 1, all the diffusers illustrated, except the Porex sintered porous plastic, produced bubbles finer than 4.5 mm in diameter.

As is deducible from a comparison of the data in Table 1, a diffuser membrane which produces bubbles having mean diameters greater than 4.5 mm fail to produce a dissolved oxygen transfer rate comparable to those membrane producing bubbles having a diameter less than 4.5 mm.

The oxygen level in each reactor was monitored continuously with a YSI probe as manufactured by the Yellow Springs Instrument Company. The procedure in determining the "oxygen uptake rate" was performed on samples withdrawn from the reactor containing the diffuser. The procedure consisted of saturating the sample with oxygen in a specially designed agitated vessel containing an $O_2$ probe, removing the $O_2$ source, capping the container and recording the rate of decrease in the $O_2$ concentration. This value measured in mg/L/hr. is the take-up rate.

The support shaft 22 may also function as a drive shaft for purposes of rotating the plurality of radially extending arm-like members 90 which are positioned on that shaft 22 proximate the region near the bottom 17 of the tank 14.

Positioned on the upper region of tank 14 is a bridge support 112 which extends essentially across the diameter 21 of tank 14. In the central region of bridge 112 proximate the longitudinal axis 26 of tank 14, the bridge 112 includes an aperture which is adapted to receive the support shaft 22 and permit the rotation of that shaft within the aperture. A power transmission means 116 may be mechanically connected with the portion of shaft 22 which extends above bridge 112. This transmission means 116 operates to rotate shaft 22 about its axis 26 and further effects a rotation of arms 90 and riffle tubes 70.

Fitted on the lower surface of each radial arm 90 may be a plurality of rake-like extensions 117. These rake-like extensions 117 are adapted to effect a squeegee-like action, i.e. scrape against the tank bottom 17, and thereby collect solids or particulates which have been deposited on surface 118 and direct them to a central collecting location proximate the end 61 of shaft 22. Rake-like extensions 117 may include a plurality of planar panels, each panel having a respective longitudinal axis 119. As shown, each longitudinal axis 119 is oriented with respect to axis 107 of the respective arm-like member 90 at a counter-clockwise rotation angle 120. Angle 120 may vary between approximately 45° to approximately 90°. The critical aspect of the extensions 117 orientation is its capacity to direct solids which have become deposited on the bottom 17 or floor of the reactor vessel 13, to a common collection location.

The radially extending arms 90 may be mounted on shaft 22 to be vertically slidable along that shaft. In one construction, the arms 90 and supports 91 are mounted to a tubular cylindrical sleeve 121 which is slidably positioned on the exterior of shaft 22. Sleeve 121 is made rotatable with shaft 22 by means of a releaseable key lock system which links shaft 22 with sleeve 121. The slidability of sleeve 121 is enhanced by an elevational control system 122 which permits the operator selectively to raise or lower the arms 90 at will. This control system 122 may include a plurality of cables 123 which are mounted to either the arms 90 or alternately to the cylindrical sleeve 121 which interconnects the various arms 90. The cables 123 extend vertically to a winch 125 or other means adapted to raise the cables 123 and effect a corresponding raising of the arms 90. The elevational control system 122 is useful in freeing the arm 90/rake extension 117 assembly when that assembly becomes mired in sediment collected on the bottom surface 17 of the tank 14. Further, the system 122 permits the operator to service the arms 90 without having to empty the tank 14.

Figure 6:
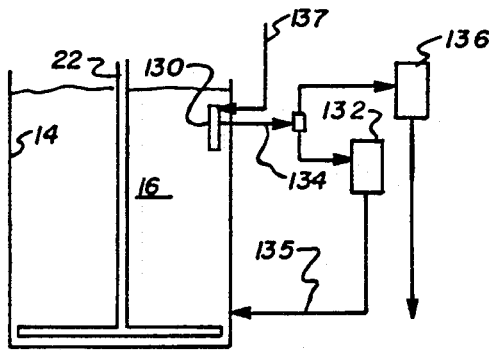
FIG. 6 is a partial schematic process diagram illustrating a filtering process of the instant invention.

As shown in FIG. 6, an internal filter 130 is positioned within the slurry 16 contained within tank 14. The filter 130 is adapted to draw liquid either continuously or semi-continuously from the slurry 16 outward and into a conventional cloudy port filtrate receiver 132. The internal filter 130 and filtrate receivers 132 and 136 function to separate clear liquor containing soluble metabolic by-products, e.g., sulphuric acid and salts, from unoxidized and partially oxidized solids.

Internal filter 130 includes a porous medium having pores dimensioned to filter solids from fluid. Owing to the relative size of the solids vis-a-vis the medium pore size, a filter 130 initially permits some solids to be introduced into filtrate conduit 134. The cloudy port filtrate receiver 132 functions to retain these solids and reintroduce them into tank 14 along conduit 135. Upon the medium being sufficiently coated with particulates, the operative medium pore size is reduced sufficiently that the enhanced filter effectively screens out solids from the slurry liquid. As the filter 130 begins its enhanced operation, the liquid in filtrate conduit 134 is routed to a secondary filtrate receiver 136. Liquid or liquor which passes through this second receiver 136 is thereafter discarded. The volume of liquor discarded is replaced by introducing water along conduit 137. This water serves to backwash filter 130, removing the coating of solids which has collected thereon.

Figure 7:
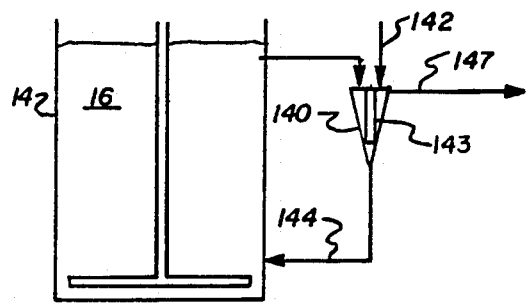
FIG. 7 is a schematic process diagram illustrating a separation process of the instant invention.

A second separation system 140 is shown in FIG. 7. The system 140 includes means of removing a volume of slurry 16 continuously or semi-continuously from the tank 14. The slurry 16 is then diluted by the addition of water from conduit 142. Preferably, a flocculant is added to the water or alternately the water/slurry mixture.

The slurry/water/flocculant is agitated to produce a rapid settling floc. The mixture is placed in a settling chamber 143 for at most approximately 10-15 minutes. During this time interval, the flocculated particles produced by the action of the flocculant settle out of the mixture. The settled pulp which may include unoxidized, oxidized and partially oxidized solids is then returned to the tank 14 along conduit 144. The liquor or liquid portion of the composition is drawn off through an overflow arrangement and thereafter directed to waste disposal or other treatment along conduit 147.

Figure 5:
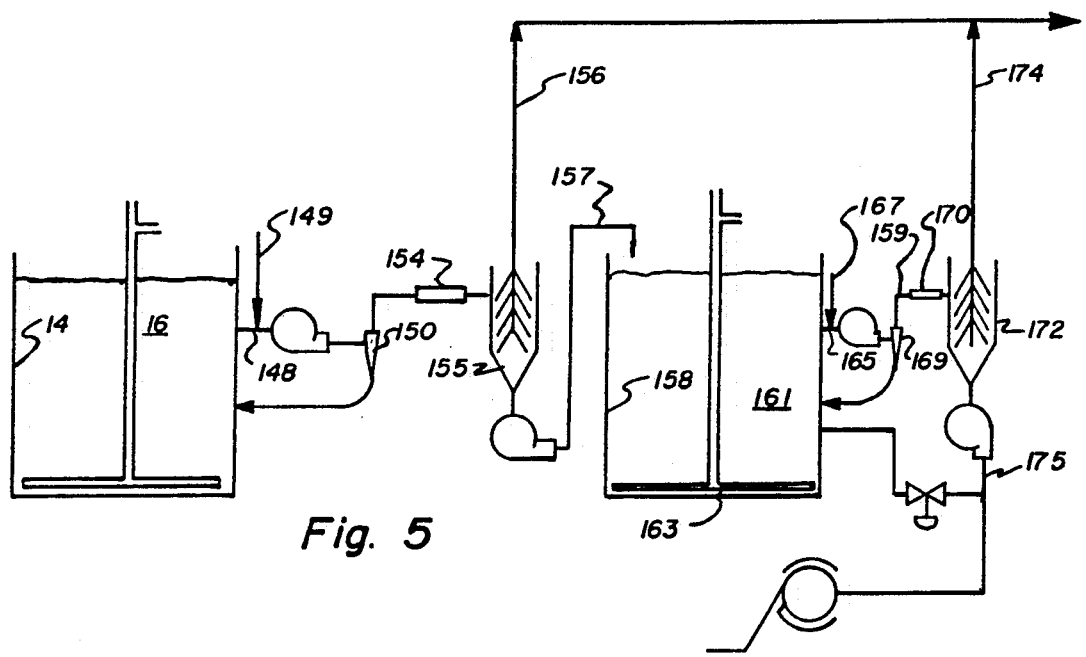
FIG. 5 is a schematic process diagram illustrating the process of the instant invention.

FIG. 5 illustrates a preferred system which operates to not only effect a solids-liquid separation but further operates to effect a separation of non-oxidized solids from partially oxidized solids. As shown, slurry 16 is drawn either continuously or semi-continuously from tank 14 through a conduit 148. Water is added to the slurry through conduit 149. The water/slurry mixture is then directed to cyclone 150. The cyclone functions to separate the relatively light non-oxidized solids from the heavier, partially oxidized solids which make up the remaining components of the water/slurry mixture. The principles operative in cyclone separation are well appreciated in the art. The non-oxidized solids are thereafter returned to tank 14 for purposes of processing. The liquid/partially oxidized solids mixture is then mixed with a flocculant as indicated by the block designated generally 154. The flocculant/liquid/partially oxidized solids mixture is then directed to a sedimentation device 155 wherein the liquid is substantially separated from the partially oxidized solids by a sedimentation process similar to that shown in FIG. 7. The liquid is directed along conduit 156 to treatment or waste disposal.

The separated partially oxidized solids are channeled along conduit 157 to a second bioreactor vessel 158 which operationally parallels that of vessel 13. Vessel 158 includes a tank 163 adapted for retaining a slurry composed of metal-ladened solids, liquid, bacteria capable of oxidizing sulfide material, e.g., thiobacillus ferrooxidans and thiobacillus thiooxidans, nutrients such as oxygen and carbon dioxide.

Vessel 158 includes a separation system 159 for separating solids from metabolic product-ladened slurry liquid. As shown, slurry 161 is drawn either continuously or semi-continuously from tank 163 through a conduit 165. Water is added to the slurry through conduit 167. The water/slurry mixture is then directed to cyclone 169. The cyclone functions to separate the relatively light, non-oxidized solids from the heavier partially oxidized solids which make up the remaining components of the water/slurry mixture. The principles operative in this separation process are well appreciated in the art. The non-oxidized solids are thereafter returned to tank 163 for purposes of processing. The liquid/partially oxidized mixture is then mixed with a flocculant as indicated by the block designated generally 170. The flocculant/liquid/partially oxidized solids mixture is then directed to a sedimentation device 172 wherein the liquid is substantially separated from the partially oxidized solids by a sedimentation process similar to that shown in FIG. 7. The liquid is directed along conduit 174 to treatment or waste. The separated partially oxidized solids are directed along conduit 175 to an external liquid/solid separation system or are recycled back to reactor 158.

The design of the various separation systems is dictated by the necessity of limiting the amount of time in which the solids (both non-oxidized and partially oxidized) are removed from the oxygen-rich environment found within either the primary reactor vessel 14 or secondary reactor vessel 158. The bacteria utilized in the instant invention attach themselves to solid materials. When those materials are removed from the vessel, provision of oxygen to the bacteria to maintain their activity rate is limited to that oxygen extant within the particular volume of slurry removed, i.e., the removed slurry is not typically provided with an independent supply of oxygen. Given this condition, the separating systems are configured to provide a streamlined arrangement for quickly removing the process delimiting soluble metabolic by-products, found in the liquid portion of the slurry, to permit the reintroduction of the bacteria-laden solids back into the oxygen-rich environment found within one of the reactor vessels 13 or 158. In a preferred construction, the instant invention contemplates restricting the maintenance of the solids out of the reactor vessel environment to a time period of at most 10-15 minutes.

The process of the instant invention consists substantially of distinct steps. The first step includes a grinding operation of the subject metal-bearing solids. Specifically, the solids are ground to a predetermined size to aid in extraction. The grinding operation serves to increase the surface area of the solids which are to be subjected to the action of the bacteria. Further, the grinding of the solids aids in the suspension of those solids within the liquid slurry. The actual size of the ground solids may be varied so as to correspond to the particular properties of the material being processed.

Preferably, closed circuit grinding is utilized with a substantial recycle ratio in order to provide a narrow sized range of solids. This grinding operation enhances a subsequent separation in the bioleaching reaction and also makes filtration and washing of the final product easier. Subsequent to the grinding operation, the ground solids are placed within a storage thickener and concentrated to a dense slurry. This formation of a dense slurry permits the operator to either intermittently or continuously feed the solids into the bioreactor vessel. The slurry is introduced into the reactor vessel together with a sufficient supply of bacteria, e.g., thiobacillus femoosidans or thiobacillus thiooxidans, and the requisite nutrients, oxygen and carbon dioxide requisite for the action of the bacteria on the solids. The nutrients may include nitrogen, phosphate, magnesium and potassium.

During the operation of the bioreactor vessel, compressed oxygen or oxygen containing air (hereinafter "oxygen") is continuously directed downward through channels 86 whereupon reaching the lower regions of shaft 22 the oxygen contained within the channels 86 is forced outwardly through radial arms 90 and subsequently ejected through diffusers 92. As the oxygen passes outward through the diffuser pores, small oxygen bubbles as opposed to larger aggregate bubbles are released into the fluid slurry 16.

Due to the rotation of the arms 90, the bubbles are distributed over a wide, substantially horizontal planar area of the lower regions of the tank 14. This rotation, together with the small dimension of the diffuser pores effects a wide distribution of the very small oxygen bubbles. Further, the rotation aids in hindering any formation or collision of bubbles, which collision may lead to the formation of aggregate bubbles having a smaller surface to volume ratio than that attendant a plurality of smaller oxygen bubbles.

The central drive shaft 22 is rotated at a relatively slow speed, preferably approximately four (4) revolutions per minute. Air bubbles rise through the slurry at an approximate rate of four to six inches per second. The speed of the shaft 22 rotation is adjusted such that bubbles released by a first diffuser at a given location have risen out of that location before the subsequent release of bubbles in that location by an adjacent second diffuser. Theoretically and ideally, each diffuser releases bubbles over the complete surface area of its respective porous membrane 1. Due to the rotation of the diffuser, a continuous and generally spiral-shaped helix configuration of bubbles, having a width approximately equal to that of the diffuser, is generated within the slurry and rises uniformly upward through the slurry. The speed of the shaft 22 is ideally adjusted whereby none of the helixes, as generated by the respective diffusers, intersect one another. Thereby a plurality of adjacently positioned helixes composed of bubbles rise uniformly through the body of slurry.

Naturally, given the turbulence and non-homogeneity of the slurry, this idealized bubble flow pattern does not occur in practice. Instead, the rotation speed may be adjusted to approximate the ideal flow pattern so as to optimize the dispersion of air bubbles within the body of the slurry.

The oxygen bubbles rise through the slurry 16 and thereby facilitate the assimilation of that oxygen by the bacteria residing within the tank. The effect of the small apertured diffuser pores in creating very fine bubbles together with the rotative action of the rotary arms 90 serving to widely disperse those bubbles about the bottom of the tank creates a condition wherein a large portion of the oxygen in the bubbles is dissolved into the aqueous phase within the slurry 16. The small size of the bubbles acts to not only promote a rapid dissolution of those bubbles into the aqueous phase, but further, enhances the probability of direct interfacial transfer of the oxygen to the bacteria. This interfacial transfer contrasts with the conventional practice in which oxygen is introduced into the slurry and agitated to encourage dissolution. Thereafter, under the conventional practice, upon dissolution, the oxygen is assimilated by the bacteria. Under the instant methodology, the vessel operator can introduce into the slurry a large quantity of oxygen, a portion of which is adapted for direct interfacial assimilation by the bacteria. Further, the oxygen may be supplied in a quantity in excess of the needs of the bacteria, at an energy consumption rate which is measurably smaller than the conventional approach. Indeed, under the prior practice, the high cost of achieving an adequate oxygen supply for the bacteria resulted in processes wherein the supply was purposely limited to a quantity below that required for maximum bacterial activity due to energy considerations. Under the instant method, the energy consumption is so reduced that oxygen may be supplied in excess of the amounts requisite for optimized bacterial activity, while maintaining energy costs within an acceptable cost range.

The bubbles are introduced proximate the bottom of the tank. Due to differences in specific gravity, the bubbles rise upwardly through the slurry. The slurry in contrast is being drawn downwardly as quantities of slurry proximate the bottom 129 of shaft 22 are being drawn into the interior channel 34 of shaft 22 by the air-lift suspension system and thereafter directed upwardly within that channel 34. Eventually, the slurry is discharged over the slurry surface 27 through riffle tubes 70. The effect of this slurry flow creates a general downward movement of the slurry within the tank and exterior to the interior channel 34. This slurry flow serves to retard the upward movement of the oxygen bubbles. Further, this retardation increases the residence time of the bubbles within the slurry and thereby enhances the probability that the oxygen will be dissolved within the slurry and utilized by the bacteria.

During the operation of the bioreactor vessel cold water is injected into the channel 49 of the shaft 22 and forced downwardly therein. The exothermic nature of the reaction occurring within the tank 14 serves to heat the slurry 16 within the tank. The cold water being separated from the slurry by the wall of shaft 22 absorbs heat through that wall from the higher temperatured slurry 16 as it continues downwardly through the channel 49 of the shaft 22. Subsequently, the warmed or heat-laden water is drawn upwardly through channel 53 and upon reaching the upper regions of shaft 22 the water is discharged or cooled in an external heat exchanger or cooling tower and recycled.

During the operation of the bioreactor vessel 13, air is directed downward along the interior of pipe 57, eventually exiting through a diffuser or nozzle 59. Slurry 16 which is within channel 34 of shaft 22 thereafter is driven upwardly by the motion of the air bubbles formed at the tip of diffuser 59. The air bubble/slurry mixture rises upwardly through the interior channel 34 of shaft 22. The slurry 16 subsequently exits through riffle tubes 70 and is distributed over the surface 78 of the slurry 16.

During the operation of the reactor vessel 13 an internal filtration system 130 operates continuously or semi-continuously to remove soluble products ladened solution from within the slurry mixture. These products may include sulphates, sulphuric acid and arsenic acid. As shown, a filter medium 130 serves initially to screen solid particulates from entering a conduit system which is directed to a cloudy port filtration system 132. The internal filter 130 is fitted with a backwash water conduit 137 whereby water may be injected along conduit 137 and to replace the solution removed as well as to discharge particulates which have collected on the internal filter medium 130.

Critical to a proper operation of the instant invention is the control of the constituents and environment within the reactor vessel. The factors of special importance include temperature, the rate and mechanism of oxygen input, the ratio of biomass (bacteria) to suspended solids, the ratio of reacted solids to unreacted solids, the concentration of soluble species generated as products or by-products and the concentration of carbon dioxide and nutrients.

The preferred species of bacteria utilized in the instant process are thiobacillus ferrooxidans or thiobacillus thiooxidans which are most stable and exhibit the broadest set of enzymematic activity when their ambient temperature is maintained in approximately the 35-36 Celsius range, i.e., the mesophilic range. Upon the temperature rising above approximately 46 Celsius, these particular species of bacteria are either extinguished or their activity severely limited. In that the reaction effected within the reactor vessel is exothermic in nature, absent a withdrawal of the heat produced in reaction, the stability of the bacteria is sacrificed. Accordingly, the instant reactor vessel includes a heat exchanger adapted to absorb heat produced within the vessel 13 and transfer that heat from the vessel to effect thereby an optimized thermal condition for bacteria growth and activity.

The rate and mechanism of oxygen input into the vessel has been discussed above. Due to the input of oxygen into the slurry in the form of widely dispersed small bubbles (i.e., having mean diameters less than approximately 45 mm.) a high surface to volume ratio of oxygen is obtained. The minute size of the bubbles effects an increased ratio of dissolution or transition of the oxygen directly into the water. Further, the bubble size results in an enhanced quantity of oxygen-ladened bubbles which permit interfacial transfer of the oxygen to the bacteria. Owing to the density difference between the oxygen bubbles and the slurry, the bubbles have a limited residence time within the slurry before rising to the surface of the slurry and discharging into the environment. The present invention involves a means of making the oxygen readily assimilatable upon its input into the slurry.

Resultingly, the oxygen is in a useful form throughout its ascension time through the slurry. Indeed, in tests conducted with a prototype of the vessel, oxygen uptake rates in the range of 500 milligrams per liter per hour were obtained at an oxygen transfer efficiency greater than 60%. Efficiency is defined for this instance as the amount of oxygen absorbed by the bacteria divided by the initial amount of oxygen introduced into the vessel.

The rotation of the arms effects a dispersion of the bubbles about a substantially horizontal plane within the vessel. The arms are therefore relatively slow in rotation in comparison to the typical tip speed of turbines used in the conventional methodology.

Resultingly, the arms avoid cavitation effects thereby preserving the high surface/volume ratio of the bubbles. Further, the relative slow arm rotation minimizes both the turbulence within the slurry and the energy requirements requisite to operate the vessel.

In normal operation, the oxygen input rate is maintained at a constant rate. This rate is of sufficient magnitude to exceed the needs of the bacteria resident within the vessel. This approach contrasts with the conventional method wherein, due to the energy expense, the oxygen supply may typically be held to a quantity below the requisite level for optimum bacterial activity.

The most important criteria attending the optimum operation of the instant process is the maintenance of a high biomass to solids ratio. The biomass population may be limited by an inadequate supply of oxygen, carbon dioxide, nutrients, or alternately an excessive supply of soluble metabolic end products or by-products. Under the instant method the supply of oxygen, carbon dioxide and nutrients are maintained at levels which exceed the demands of the bacteria population. The metabolic end products are selectively removed from the slurry during the vessel's operation. These end products are constituted of two types: soluble constituents and insoluble reacted solids. The soluble constituents are removed by processing the slurry to effect a separation of suspended solids from the liquid liquor or medium. This separation is achieved by a continuously or semi-continuously operating, internal filter within the bioreactor. Alternatively, the separation may be achieved by sedimentation.

Flocculation of all of the suspended solids may be employed to enhance the solids-liquid separation. Upon separation, the clarified liquor is removed from the system while captured solids are advanced either to a second reactor vessel or are returned to the first reactor vessel. The bacteria typically adhere to the solid material. The separation of solids from liquid medium results in a minimum loss of bacteria from the vessel population in that the separated solids are subsequently and quickly returned to the first or second reactor vessel.

The solids removed may include reacted solids and unreacted solids. The reacted solids are separated from the unreacted solids by the use of selective separation in a cyclone, centrifuge or gravity settling device. Unreacted solids are returned to the reactor vessel. Partially reacted solids are advanced to a secondary reactor for purposes of further bacterial processing. The final reacted product is removed and may be subjected to conventional leaching.

The emphasis of the instant process is the maintenance of the driving force of the reaction at a maximum. Due to the improvement in oxygen supply technology of the instant invention, the method presently results in the optimization of processing by providing a surplus of oxygen and other requisite nutriment, stabilizing the ambient temperature to an optimal level and further removing reaction delimiting metabolic by-products. Further, this removal is continuous and operates to minimize the loss of bacteria which resulted under the conventional method.

Figure 19:
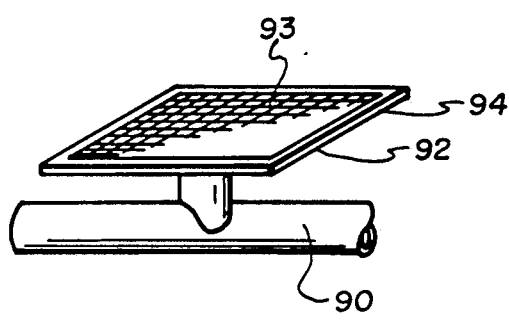
FIG. 19 is an elevated perspective view of an altenative diffuser structure of the invention.
Figure 20:
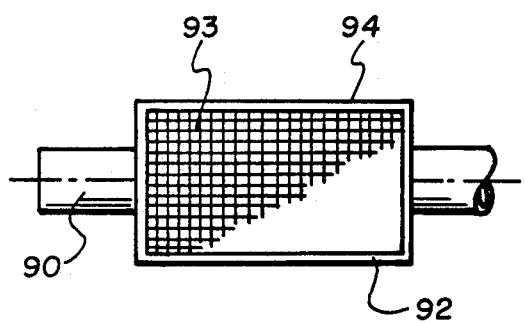
FIG. 20 is a top plan view of the diffuser structure illustrated in FIG. 19.
Figure 39:
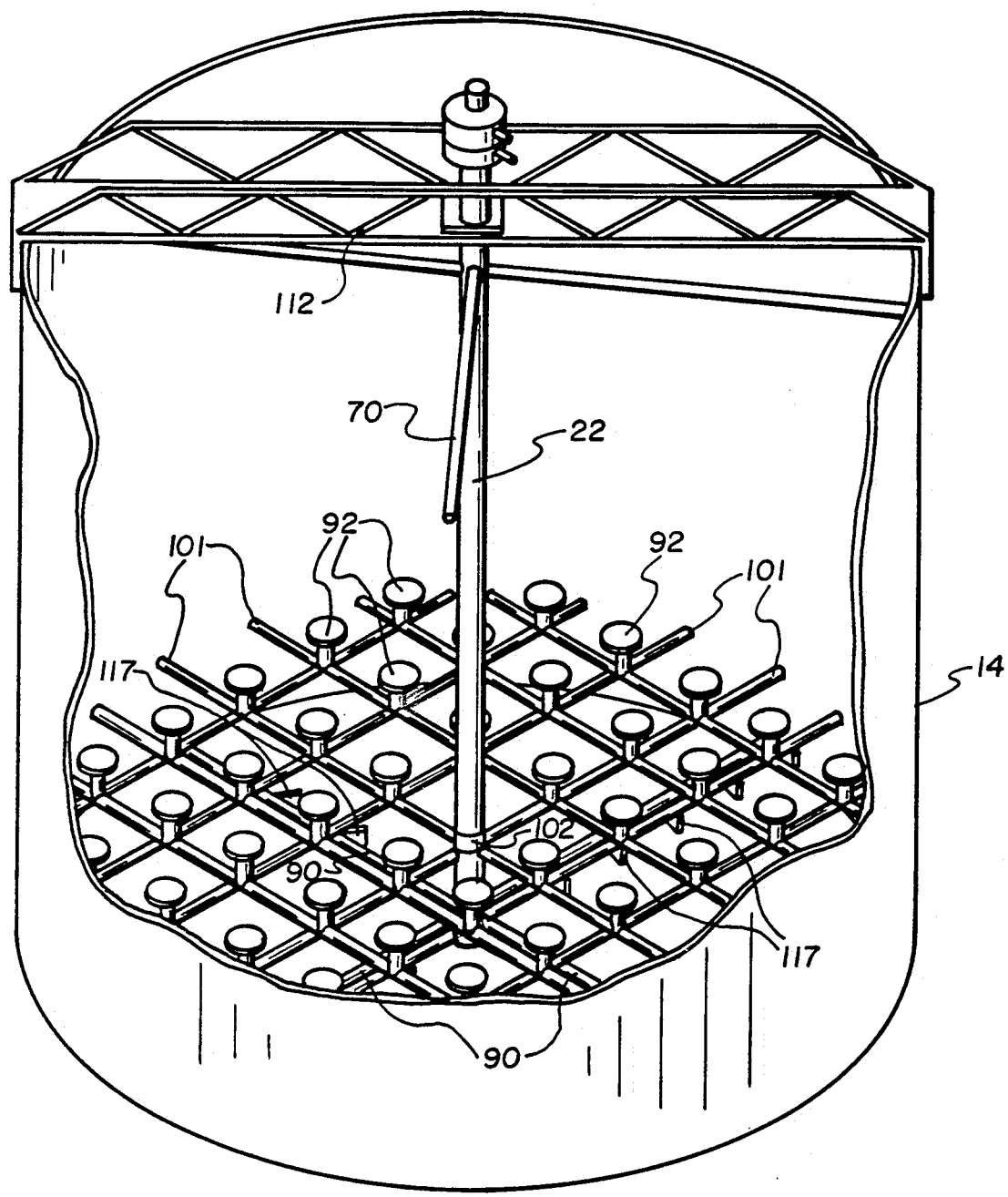
FIG. 39 is an elevated perspective view of a second embodiment of the bioreactor vessel of the instant invention including a cut-away portion illustrating a stationary grid-like frame having a plurality of horizontally oriented diffusers positioned within a containment vessel. A plurality of radially extending arms having rakes mounted thereto is rotatably positioned below the grid-like frame.
Figure 40:
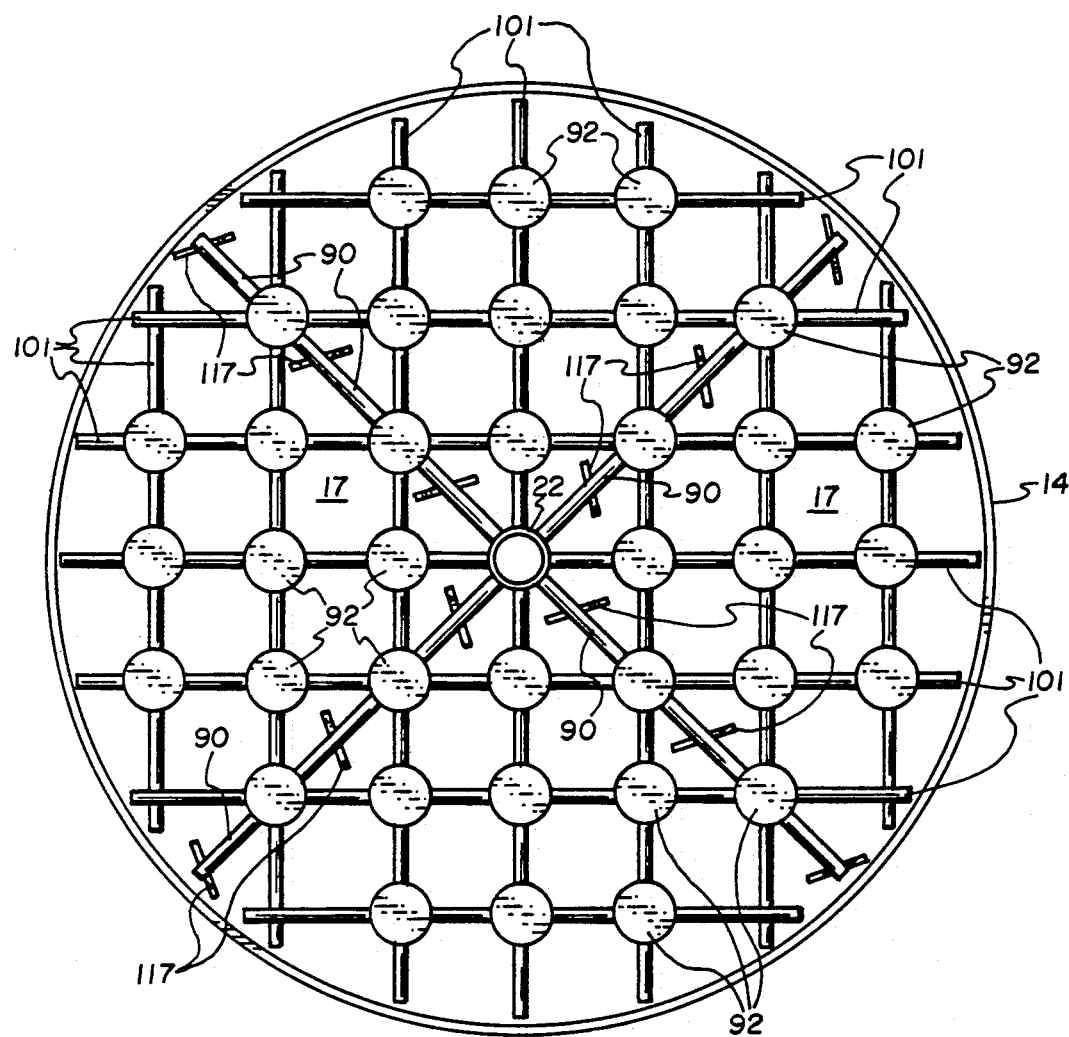
FIG. 40 is a top plan view of the containment vessel shown in FIG. 39 illustrating the stationary diffuser fited grid framework in association with the rotatable rake-fitted radial arm arrangement.

The embodiment illustrated in FIGS. 39 and 40 includes a grid-like support frame 100 which is stationarily mounted on the walls 14 of the tank and slidably secured to the central shaft 15. In this construction, the shaft 15 is made rotatable about its axis 24. The grid frame 100 does not rotate with the shaft 15. Frame 100 includes a first plurality of elongate conduits 1 arranged spaced apart and parallel to one another. A second plurality of the conduits 1 is also arranged spacedly apart and parallel to one another. The first plurality of conduits is arranged perpendicular to the second plurality of conduits thereby defining the grid-like arrangement as shown. m The conduits 1 are mounted to one another at their points of interaction such that the interior channels defined within the interior of each respective conduit communicates one with another. Diffusers 92A of the type illustrated in FIGS. 18 and 19 are shown installed at each intersection of a conduit 101 of the first plurality of conduits and a conduit 101 of the second plurality of conduits. Understandably, the configuration of the diffusers fitted on the grid-like frame support may be modified to include any desired configuration, e.g. horizontally oriented, quadrilaterally perimetered membrane diffusers, uprightly oriented planar on curved face diffusers, uprightly oriented or horizontally oriented tubular-shaped diffusers. The grid frame 100 is shown slidably attached to shaft 15 by an annular collar 102.

In the embodiment illustrated in FIGS. 39 and 40, the radial arms 90 are fitted solely with rake-like extensions 117. The shaft 22 and radial arms 90 are rotatable in the embodiment similar to the structure shown in FIG. 1. Since the diffusers 92B in this construction are locationally fixed, this construction relies mainly on the agitation created by the air bubbles rising through the slurry to retain the solids in the slurry in suspension. Further, little if any slurry flow over the diffuser membrane 93 occurs in this construction. Clogging of the diffuser membrane pores is alleviated by passing a quantity of air through the diffuser 92 at a pressure sufficient to dislodge any solids which may have clogged the diffuser pores. Since the membrane is fabricated from a flexible fabric, the fabric tends to expand under the higher air pressure loading similar to the action of a balloon. Those solids which have collected in the diffuser pores are resultingly forcefully ejected outward from the membrane surface.

In this embodiment, the operation of the rake-like extensions 177 becomes more important than in the rotating diffuser embodiments, e.g. the embodiment of FIG. 1. Since the diffusers 92 do not rotate, concentrations of solids settling out of the slurry tend to build up on the tank bottom 17 between adjacent pairs of diffusers 92. Absent some means of eliminating these concentrations, the possibility exists that these concentrations may build up until they actually cover over the stationary diffusers 92. Therefore, the action of the rotating arms 90 with their attendant rake-like extensions 117 which sweep and scour the tank bottom 27 tend to eliminate concentrations of settled solids by operating to lessen, if not eliminate the likelihood that solid concentrations of sufficient size to hinder the diffuser operation will be built up.

In those embodiments having an air lift suspension e.g. defined with the center shaft 22, the solids swept from the tank bottom are directed to the center of the tank bottom 17 due to the orientation of the rake-like extensions 117. The air lift within the center shaft 15 operates to pick up solids from proximate the center region of the tank bottom and lift them above the surface level of the slurry in the tank. The solids are then poured over and onto that slurry surface by arms 70 thereby redistributing the solids into the slurry.

It is to be understood that the embodiments of the invention herein described are merely illustrative of the application of the principles of the invention. Reference herein to details of the illustrated embodiment is not intended to limit the scope of the claims which themselves recite those features regarded as essential to the invention.

EXAMPLE

A continuous bioleaching pilot plant was operated on a pyrite-arsenopyrite gold concentrate containing about one ounce of gold per ton, provided by a Canadian gold mine, to determine if this method would be viable for improving gold recovery by subsequent cyanidation. The test campaign lasted several months while the bacteria were acclimated to this particular concentrate. Applicants utilized a two-stage biological leaching circuit with cyclone separation between stages.

Figure 21:
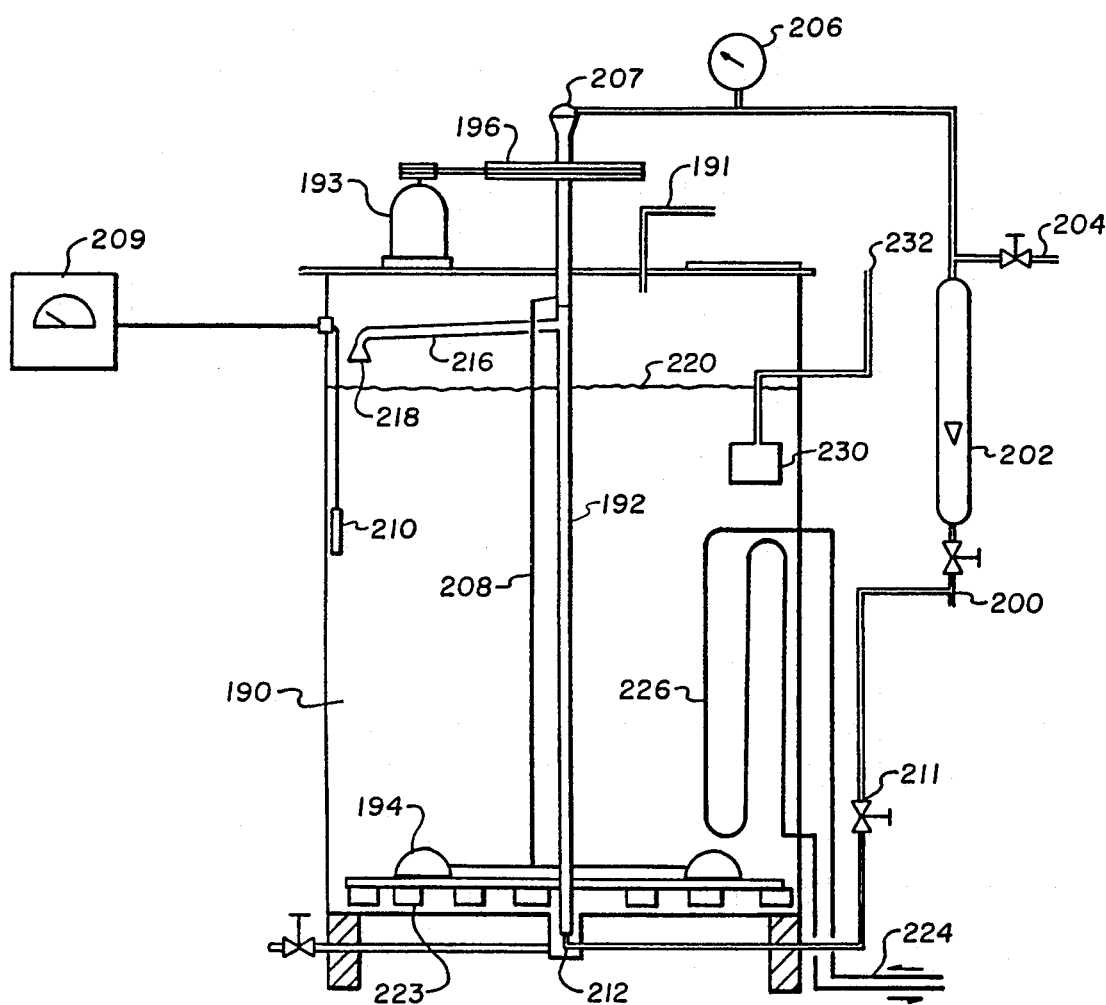
FIG. 21 is a schematic view of an experimental pilot reactor vessel of this invention.
Figure 22:
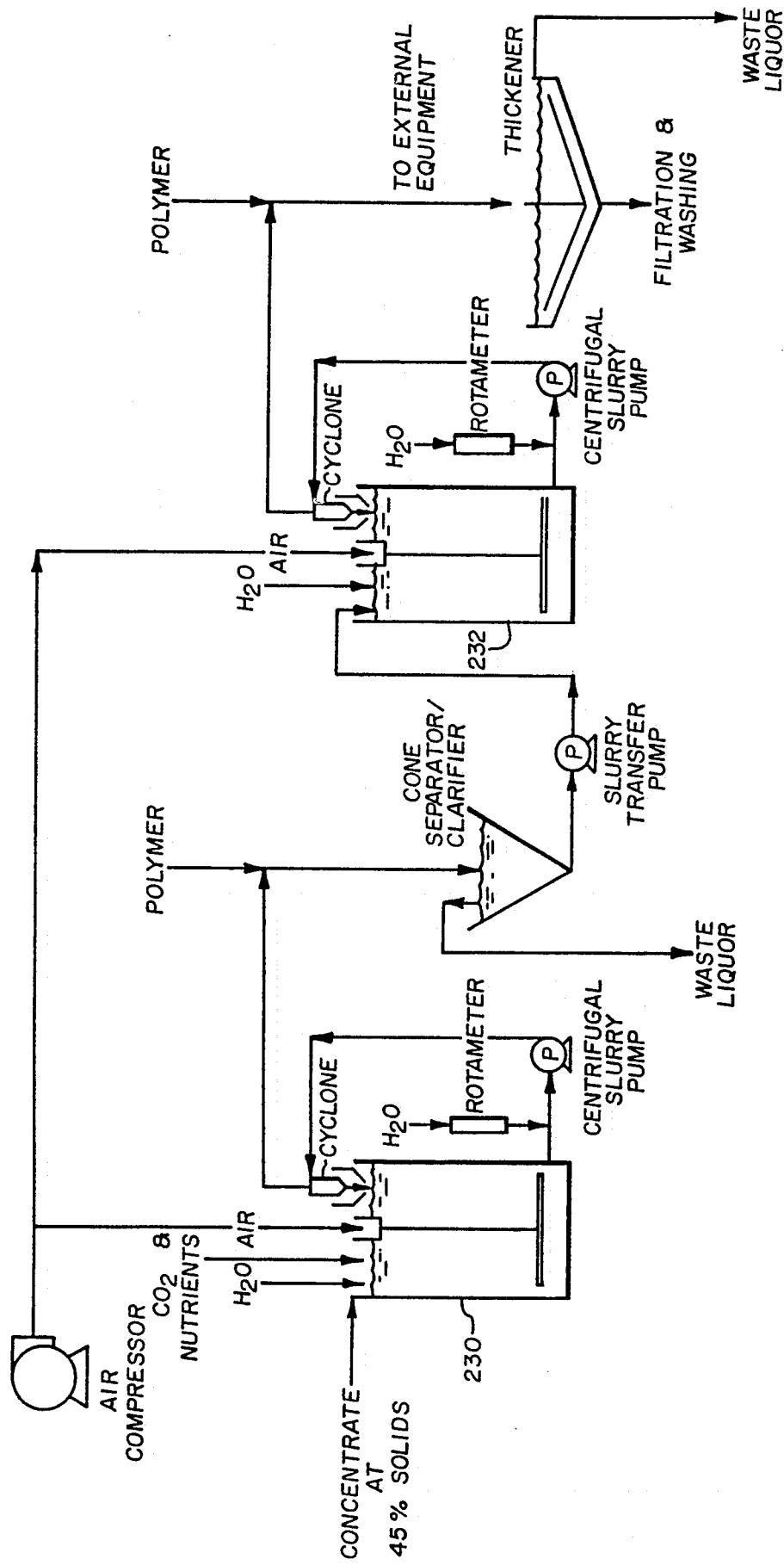
FIG. 22 is a schematic view of an experimental pilot reactor vessel system of this invention.

Applicants assembled a continuous bioleaching pilot plant in their Research Laboratory, using two 60 L. bioreactors similar to the unit illustrated schematically in FIG. 21. The unit is adapted such that finely ground concentrate may be fed continuously to the system, retained in an environment high in chemolithotrophic bacteria concentration for a period of days or weeks, and discharged as an oxidized product substantially reduced in iron, sulfur and arsenic content. The procedure used was the following: feed slurry, after regrinding of the concentrate, was introduced on an hourly basis from an agitated holding tank to the first stage reactor in which an active culture of thiobacillus ferrooxidans bacteria and partially oxidized solids was maintained. Solution was withdrawn from the reactor continuously (though it could have been withdrawn semi-continuously, dependent upon the liquor density that was to be maintained) using either an internal filtration system 230 or sedimentation circuit 202. In the former, the solids were filtered and then back-washed into the reactor which, in effect, maintains both solids and bacteria within the system, while filtrate which is relatively free of biomass was withdrawn. In the sedimentation mode, slurry was withdrawn from the bioreactor, diluted with wash water incoming through conduit 209, flocculated and thickened, and the thickener underflow returned to the bioreactor via conduit 211 while the liquor and some biomass overflow was directed to waste via conduit 200. Both systems were utilized in this study. Heat was removed from the reactor vessel by a conventional tube heat exchanger 226.

Solids were advanced from the first stage to the second via a hydrocyclone, with the cyclone underflow being recycled to the reactor while the overflow solids were thickened and sent to the second unit through a continuous feeding system. Because of the capacity of the cyclone, it was necessary to limit the cycloning to about two times per week, with approximately twenty percent (20%) of the reactor contents processed at a time. Solids were removed from the second bioreactor through the same means.

The rationale for this approach is that it will maintain a high concentration of sulfide- and arsenic-containing solids with the bioreactor while removing oxidized solids preferentially. It was found that cycloning could effect a separation between sulfide-bearing material and solids which were low in sulfide, probably due to the difference in density and the change in particle shape due to bio-oxidation. Since it is well known that a high concentration of food material (sulfide, arsenic) will result in a higher oxidation rate, this approach should minimize the reactor volume needed and maximize the oxygen transfer efficiency.

Two samples were received and tested; these samples analyzed as follows:

|  | Fe % | As % | S % | SiO2 % |
| --- | --- | --- | --- | --- |
| First Sample | 37.80 | 13.16 | 33.22 | 13.59 |
| Second Sample | 37.81 | 8.39 | 28.00 | 19.38 |

It had been reported that the gold is associated with the arsenopyrite, and that other biological process work had made possible a recovery by cyanidation of 86% of the gold. It seemed likely that this first work would have concentrated on removing only the arsenopyrite (which is leached preferentially), and because of the relatively low recovery, it was felt that it would be useful to reduce the pyrite concentration as well. Thus, the tests were designed to solubilize as much of the pyrite and arsenopyrite as possible. It was recognized that some amount of jarosite and ferric arsenate would form, and the jarosite would very likely tie up some of the silver and make it difficult to extract by cyanidation. However, it was of special interest to determine if a 2-stage system could extract both arsenopyrite and pyrite, since the bacteria seem to have a strong proclivity toward the former and poor extraction of pyrite could result. In the first tests, this appeared to be the case, and the flowsheet was changed slightly so as to minimize the effect of arsenic on the second stage. This was done by washing the material that was advanced from first stage to second stage in order to reduced the arsenic content of the liquor in the second stage. Since the bulk of the arsenic-bearing mineral was solubilized in the first stage, this effectively reduced the arsenic level background in the second stage to that which is normal for ordinary pyrite systems.

Progress of the biological oxidation reactions was monitored by measuring the feed rate and the solids removal rate, as well as the solution removal rate from each of the reactors, on a continuous basis. Solution and solids compositions within each of the reactors were measured twice a week, and materials which were removed were composited and analyzed as required. The oxygen level in each reactor was monitored continuously with a YSI probe 210 and attendant measurement meter 209. The "oxygen take-up rate," a measurement commonly used in biological waste treatment, was performed daily on samples withdrawn from each reactor.

The significant data are presented graphically in FIGS. 23-30 for the two bioreactors. It should be noted that "46" refers to the first stage reactor and "45" refers to the second stage, FIGS. 23-26 represent the first stage and FIGS. 27-30 the second. Dates are shown on the data points; on the time axis, only the days Monday-Friday are shown, although the calculated values include the weekends.

FIRST STAGE BIOREACTOR

Figure 23:
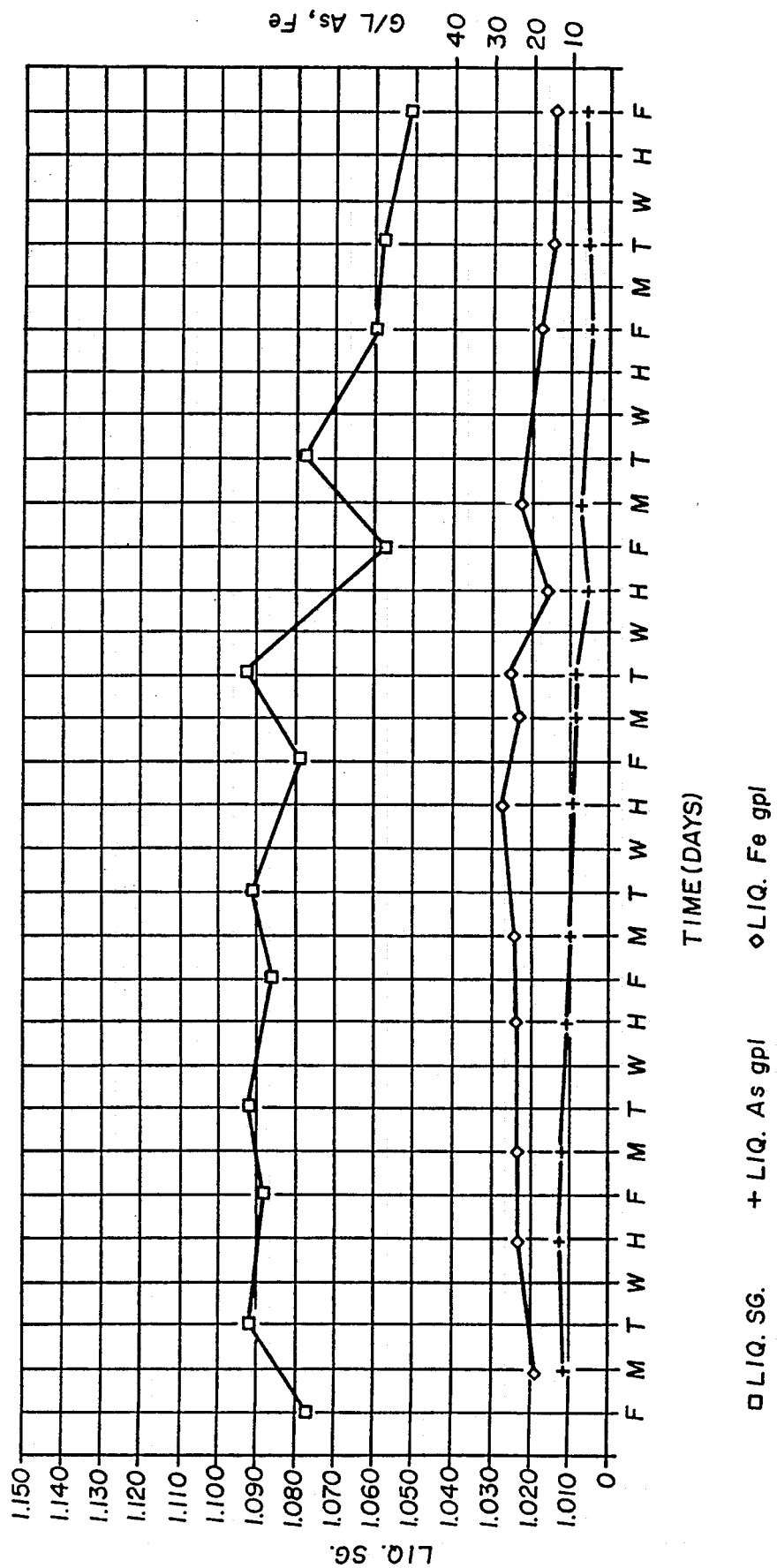
FIG. 23 is a graph illustrating the result of a liquids analysis of the experimental trial of the apparatus and process of the instant invention.

With reference to FIG. 23, solution analyses include the liquor specific gravity, arsenic and iron concentrations. Normally, liquor specific gravities of 1.08-1.12 are tolerable, with iron levels as high as 60 gpl. However, in view of the uncertainties about arsenic tolerance, liquor density was held down in order to keep the arsenic around 10 gpl, or lower. This was done by processing the required amount of slurry daily through the continuous thickener, recycling the solids to the system.

Figure 24:
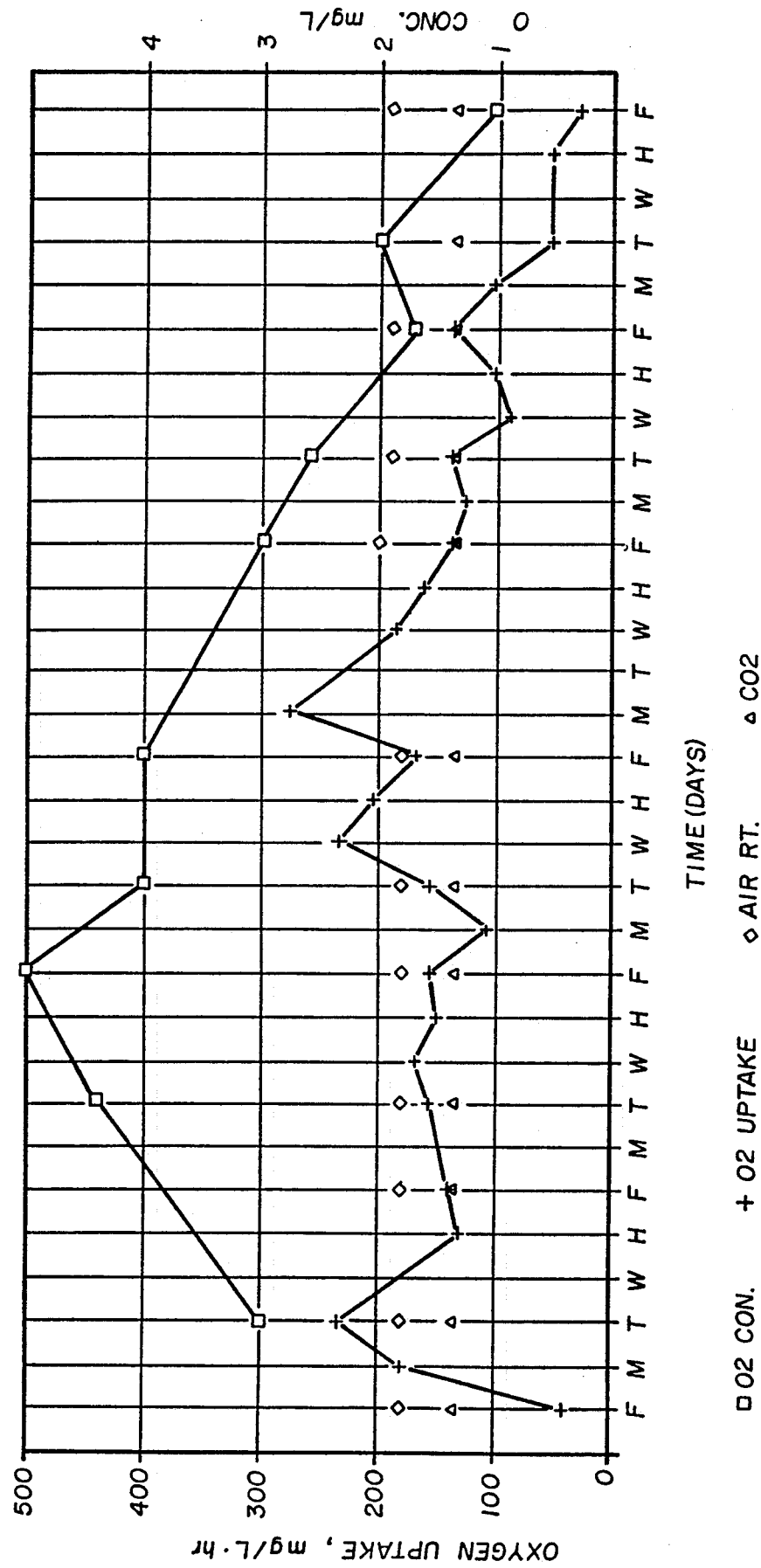
FIG. 24 is a graph illustrating the results of a gas analysis of an experimental trial of the apparatus and process of the instant invention.

FIG. 24, gas analysis, refers to the oxygen concentration in the reactor and the oxygen uptake rate of the slurry. Normally, when uptake rates are low, the oxygen concentration approaches saturation, which is about 5-6 mg/l under these conditions. As the uptake increases, the $O_2$ concentration drops off, and in order to maintain it, additional air may be applied to the diffusers. The apparent drop off in uptake rate during the last week of the campaign corresponded approximately to the termination of the feed. As will be noted from the arsenic concentration in the solids in the reactor, the actual arsenic level in the residue is fairly low, and it appeared that the principal reaction occurring in this first stage was the oxidation of arsenopyrite.

Figure 25:
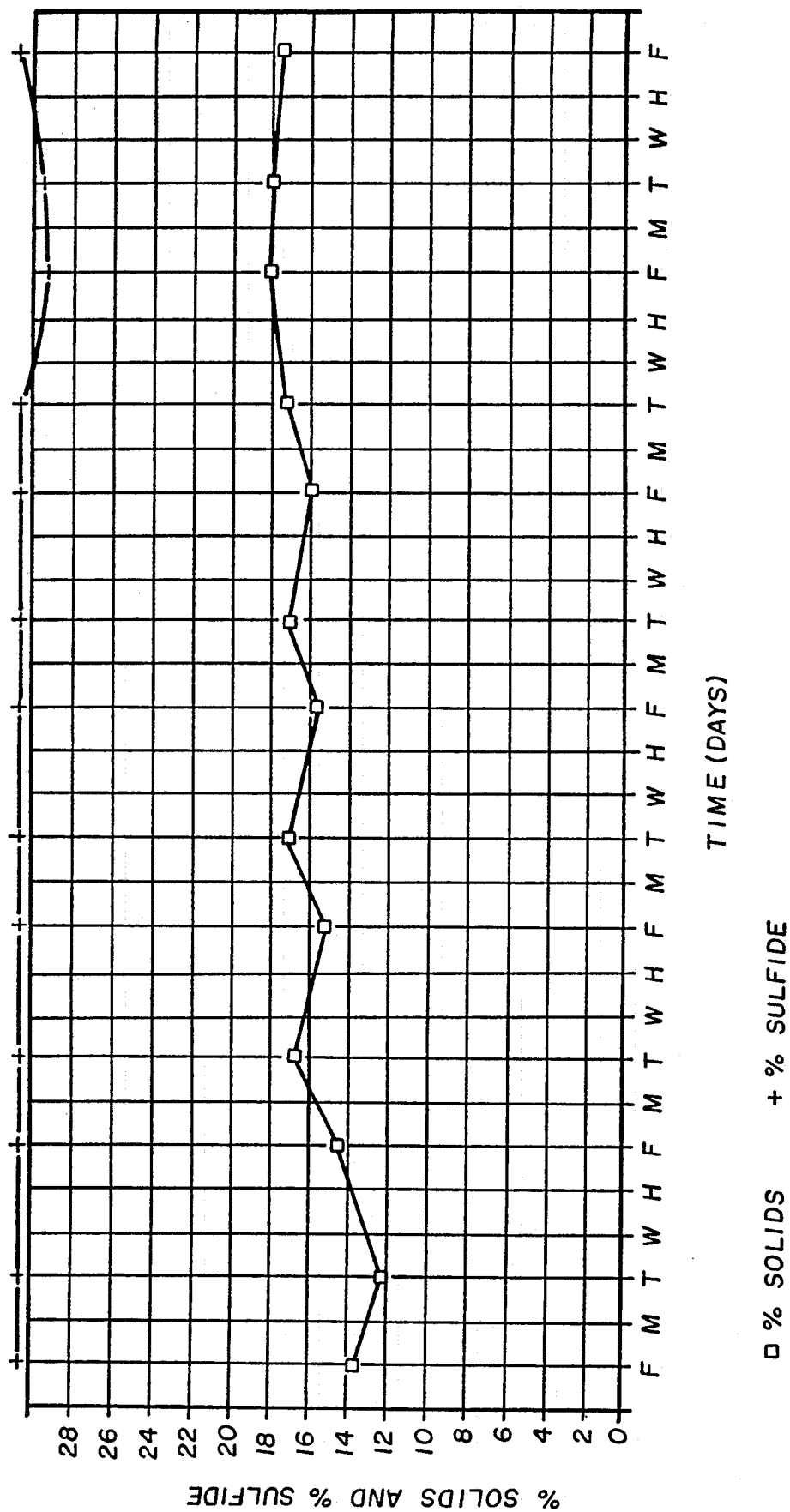
FIG. 25 is a graph illustrating the results of a solids analysis of an experimental trial of the apparatus and process of the instant invention.

The solid analyses are shown in FIG. 25, the percent solids in the reactor and the percent sulfide in the solids. It had been the intent of the program to raise the solids concentration up to about 30%, but, since this has to be done gradually in order to avoid overloading the system, a concentration above 20% was not achieved during this campaign. The percent sulfide in the solids generally was above 30%, even higher than the feed material, due to the effect of recycling cyclone underflow in which the arsenopyrite had been partially solubilized. This confirmed the earlier observations that the bacteria will preferentially oxidize arsenopyrite and will attack the pyrite only when the arsenic material is depleted.

Figure 26:
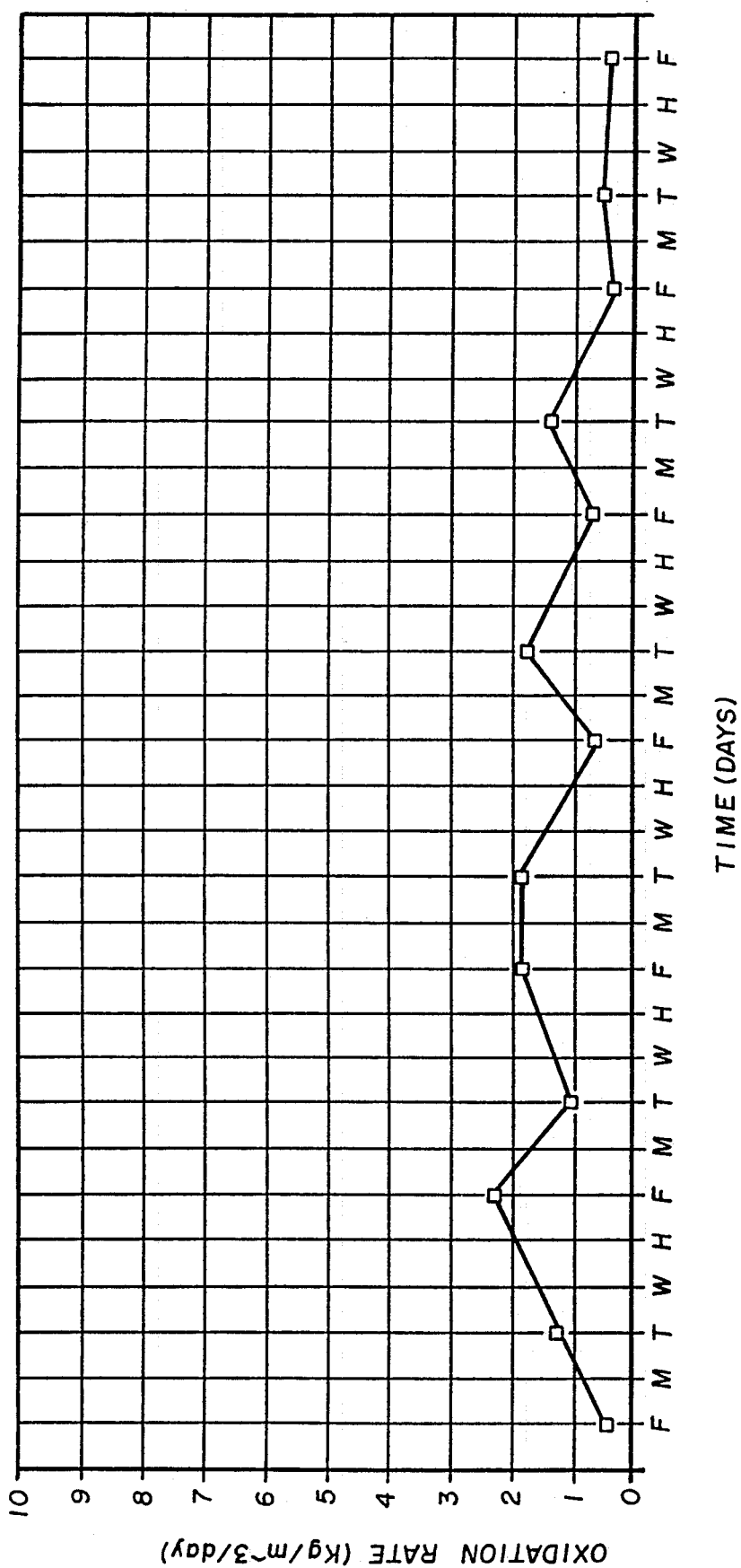
FIG. 26 is a graph illustrating the sulfide oxidation rate results of an experimental trial of the apparatus and process of the instant invention.

FIG. 26 shows the oxidation rate with respect to sulphur for this first stage reactor. It will be noted that this was higher during the first part of the campaign, dropping toward the end. This is apparently due to the increased feed rate during the last two weeks, which was an average of 1000 g/day of concentrate, compared to 600 g in the first 2½ weeks. Again, this illustrates the preference of the bacteria for arsenic.

SECOND STAGE BIOREACTOR

The second stage unit was fed primarily with thickened cyclone overflow from the first stage reactor. In order to provide sufficient feed material as necessary for proper biomass growth, since the cyclone underflow was recycling most of the pyrite back to the first stage, a portion of the reactor slurry was diluted with water to remove the soluble arsenic, thickened, and added to the feed system to the second reactor.

Figure 27:
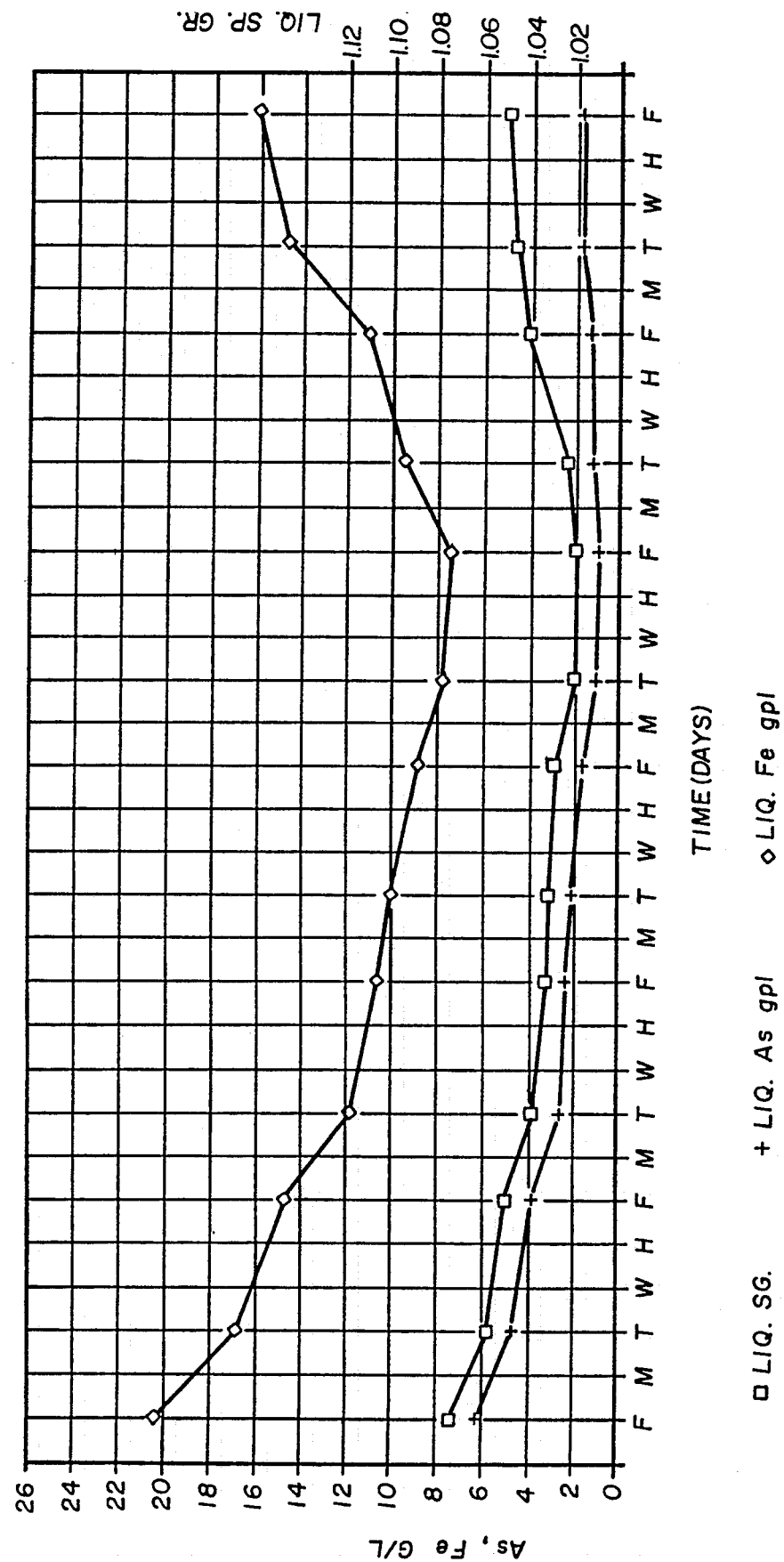
FIG. 27 is a graph illustrating the results of a liquids analysis of an experimental trial of the apparatus and process of the instant invention.
Figure 28:
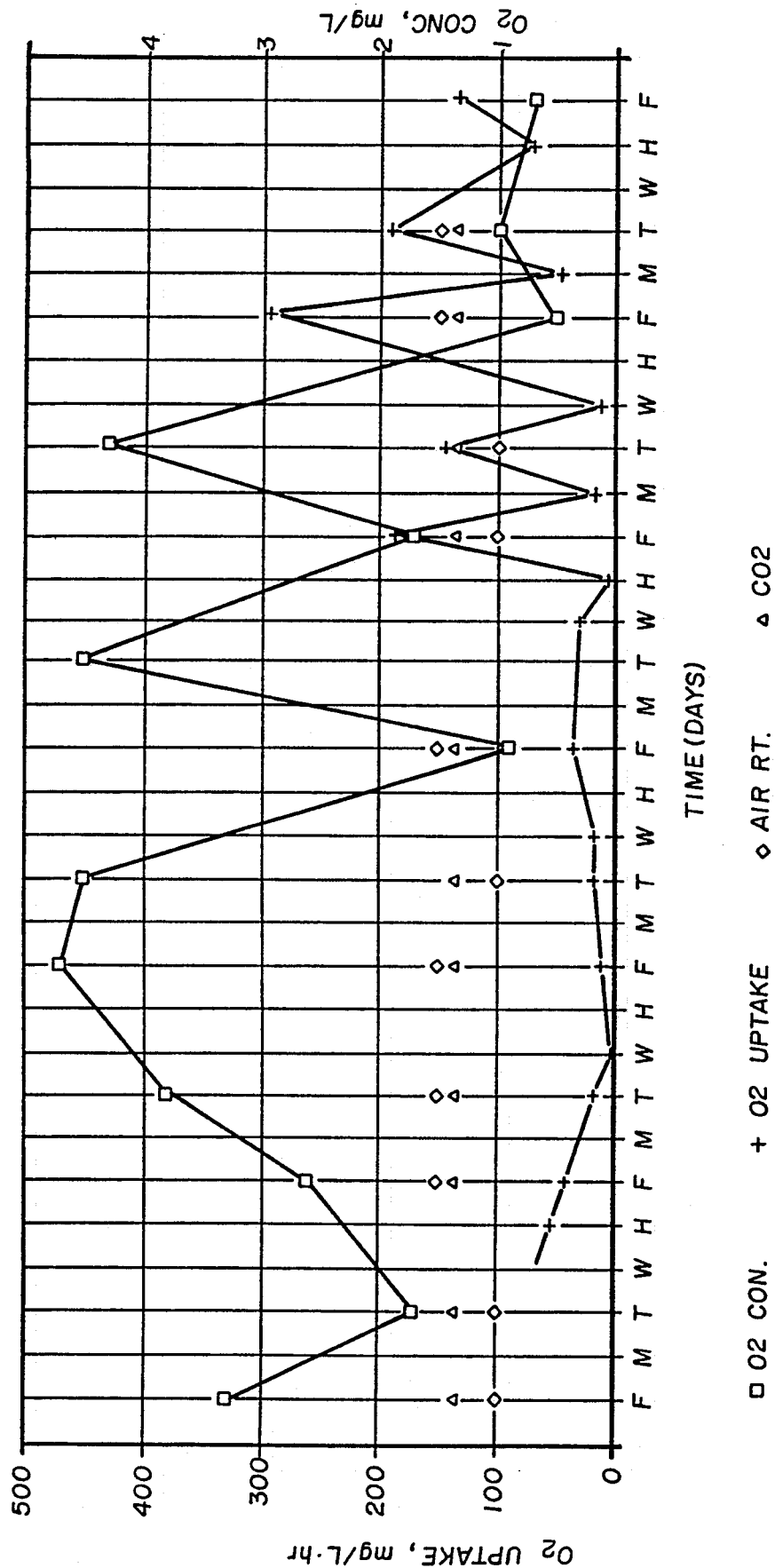
FIG. 28 is a graph illustrating the results of a gas analysis of an experimental trial of the apparatus and process of the instant invention.

FIG. 27, with data taken from Tables 3 and 4, presents the liquor analysis for this unit. It will be noted that the arsenic level was reduced significantly, while the liquor specific gravity was approaching the target range of 1.1 which was desired.

The gas analysis (FIG. 28) for this reactor was typical of the behavior which has been observed in other instances, with an inverse relationship between $O_2$ concentration and take-up rate. The unusually wide fluctuations were attributed to the lack of substrate (sulfide in the solids) and as the feed rate was increased, the fluctuations were reduced. However, it apparent that the system was not receiving nearly as much concentrate as it could have handled.

Figure 29:
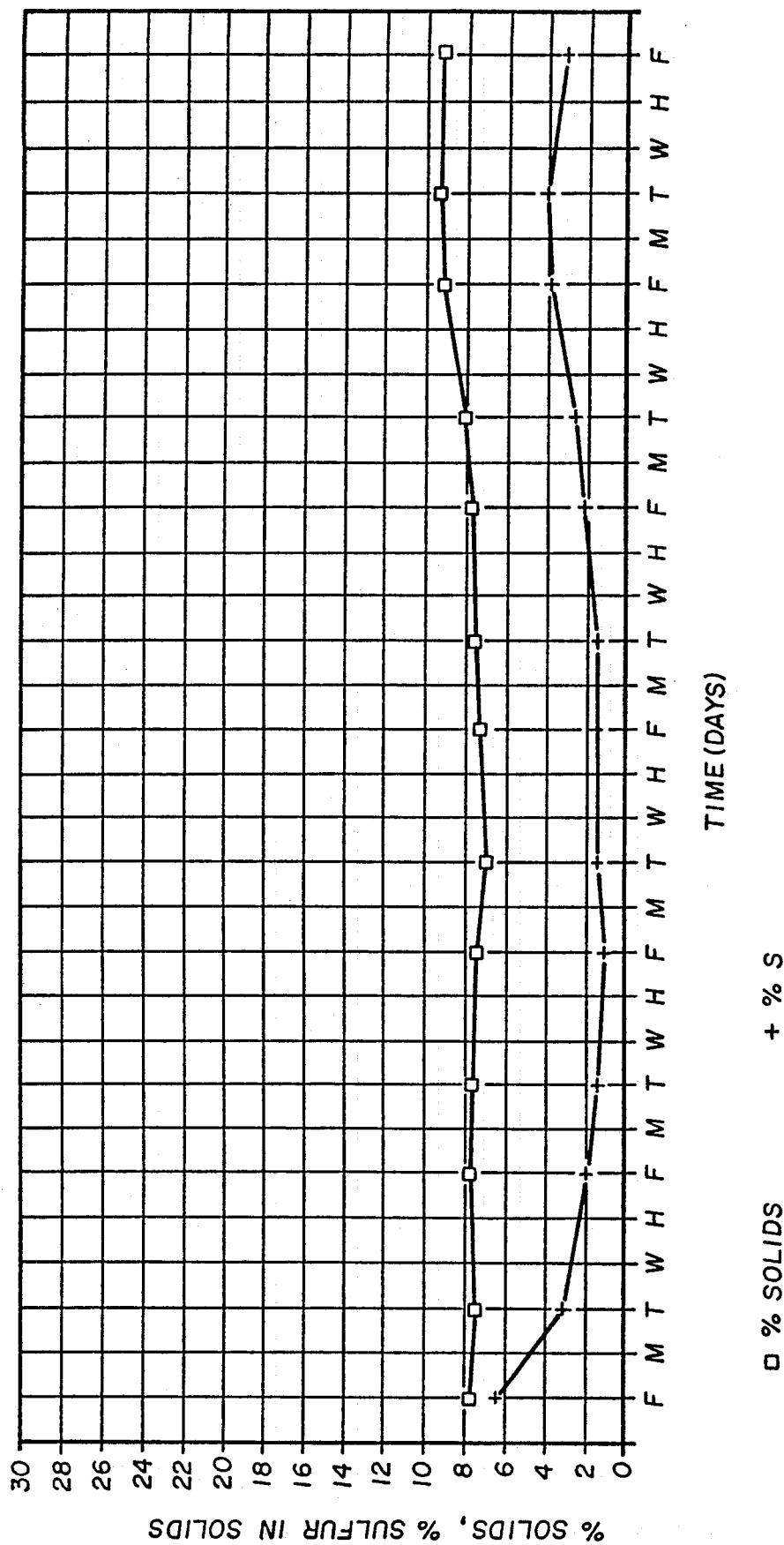
FIG. 29 is a graph illustrating the results of a solids analysis of an experimental trial of the apparatus and process of the instant invention.

FIG. 29 presents the solids analysis for this reactor. The lack of sufficient feed rate resulted in a much lower solids concentration than was desired, and it will be noted that the sulfide in the solids was generally below 4%, contrasting with the 30% in the first stage and approximately 11-25% in its feed material. The arsenic level in the solids was usually around 1%, and it is believed that most of this arsenic was present as precipitated ferric arsenate.

Figure 30:
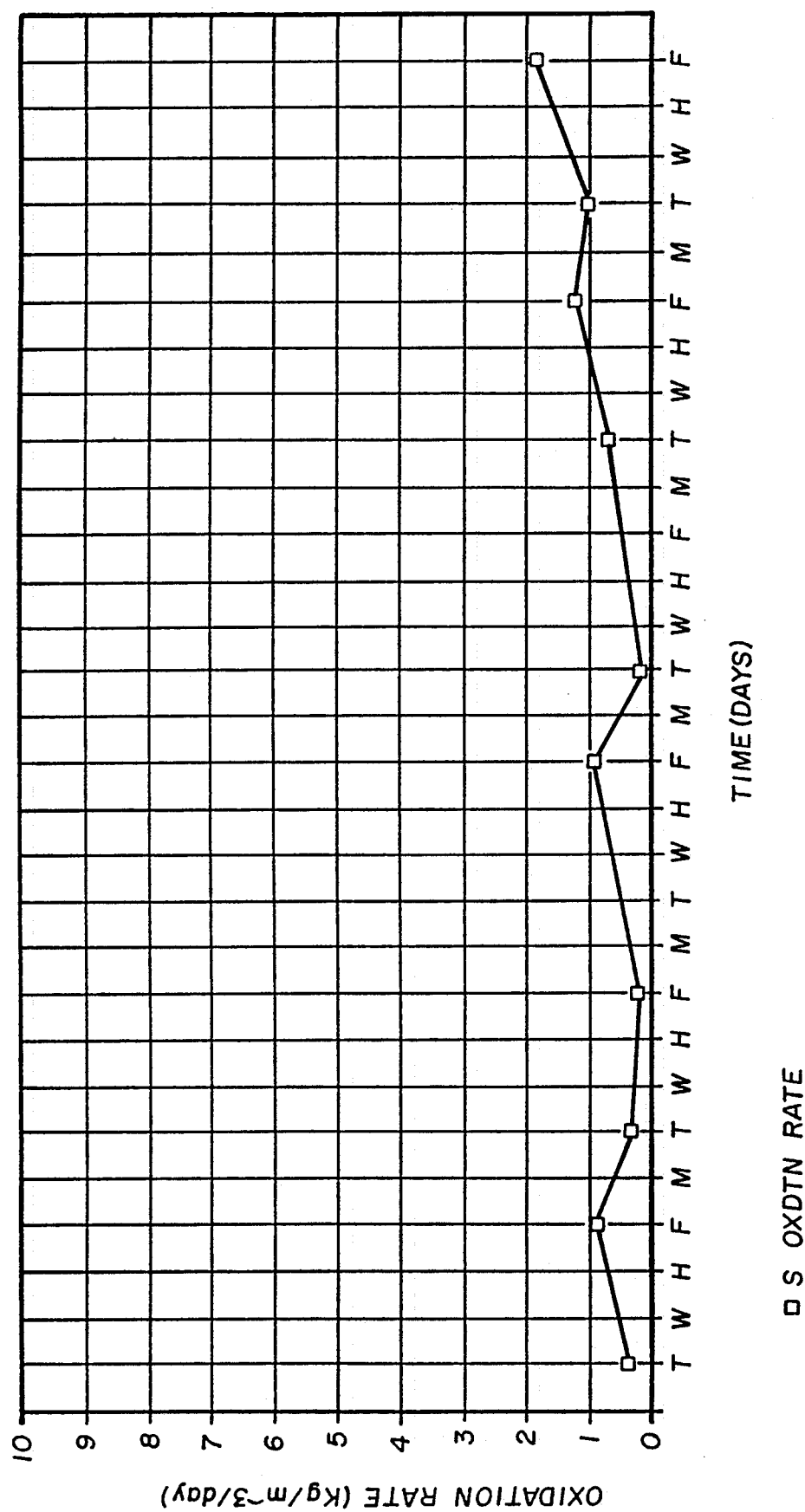
FIG. 30 is a graph illustrating the sulfide oxidation rate of an experimental trial of the apparatus and process of the instant invention.

FIG. 30 illustrates the oxidation rate, and the increase in oxidation rate as the feed rate was increased confirms the earlier premise that this reactor was not receiving an adequate quantity of unoxidized material.

Figure 31:
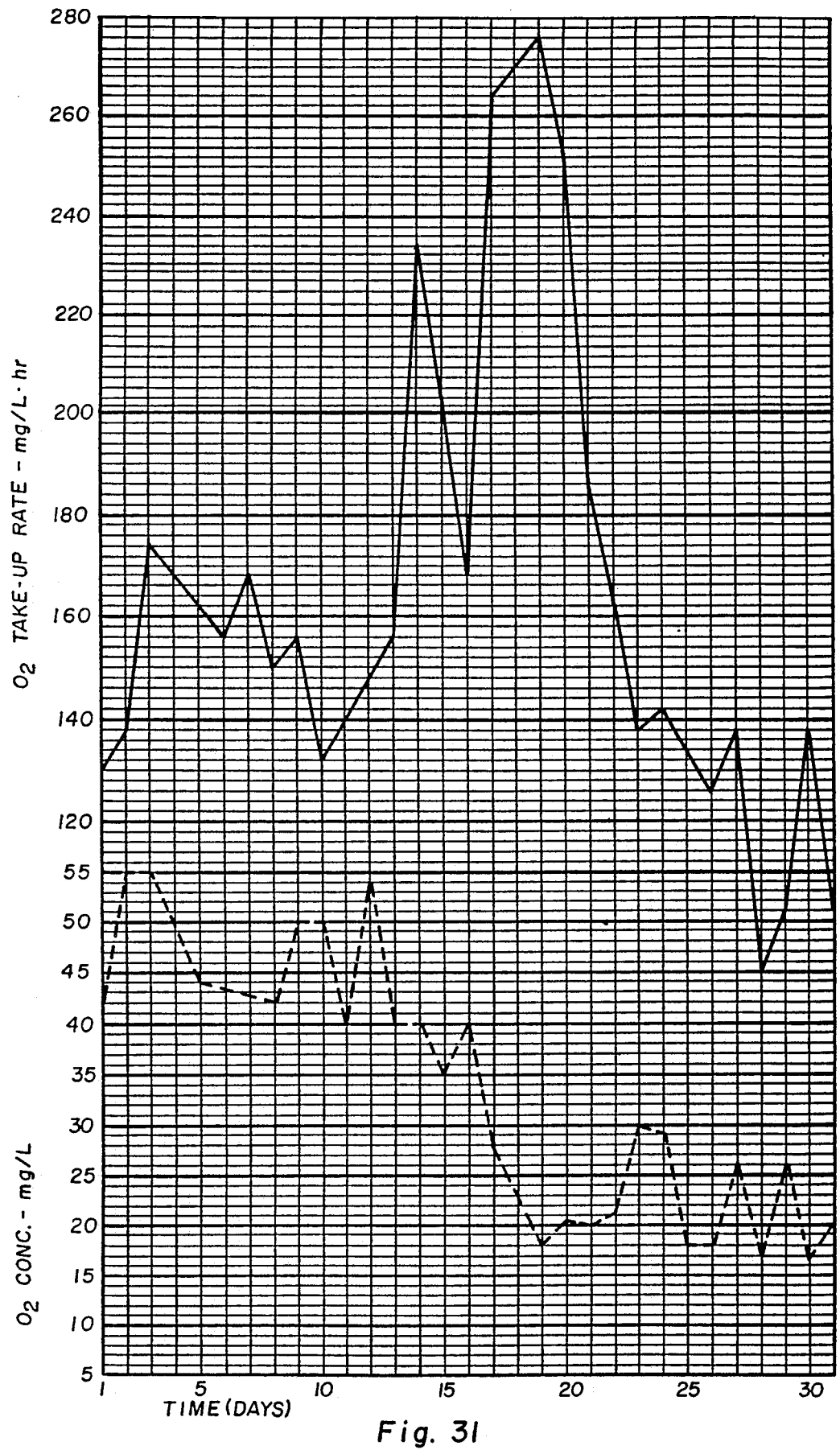
FIG. 31 is a graph illustrating the oxygen concentration and oxygen take-up rate in the primary reactor in an experimental trial of the apparatus and process of the instant invention.
Figure 32:
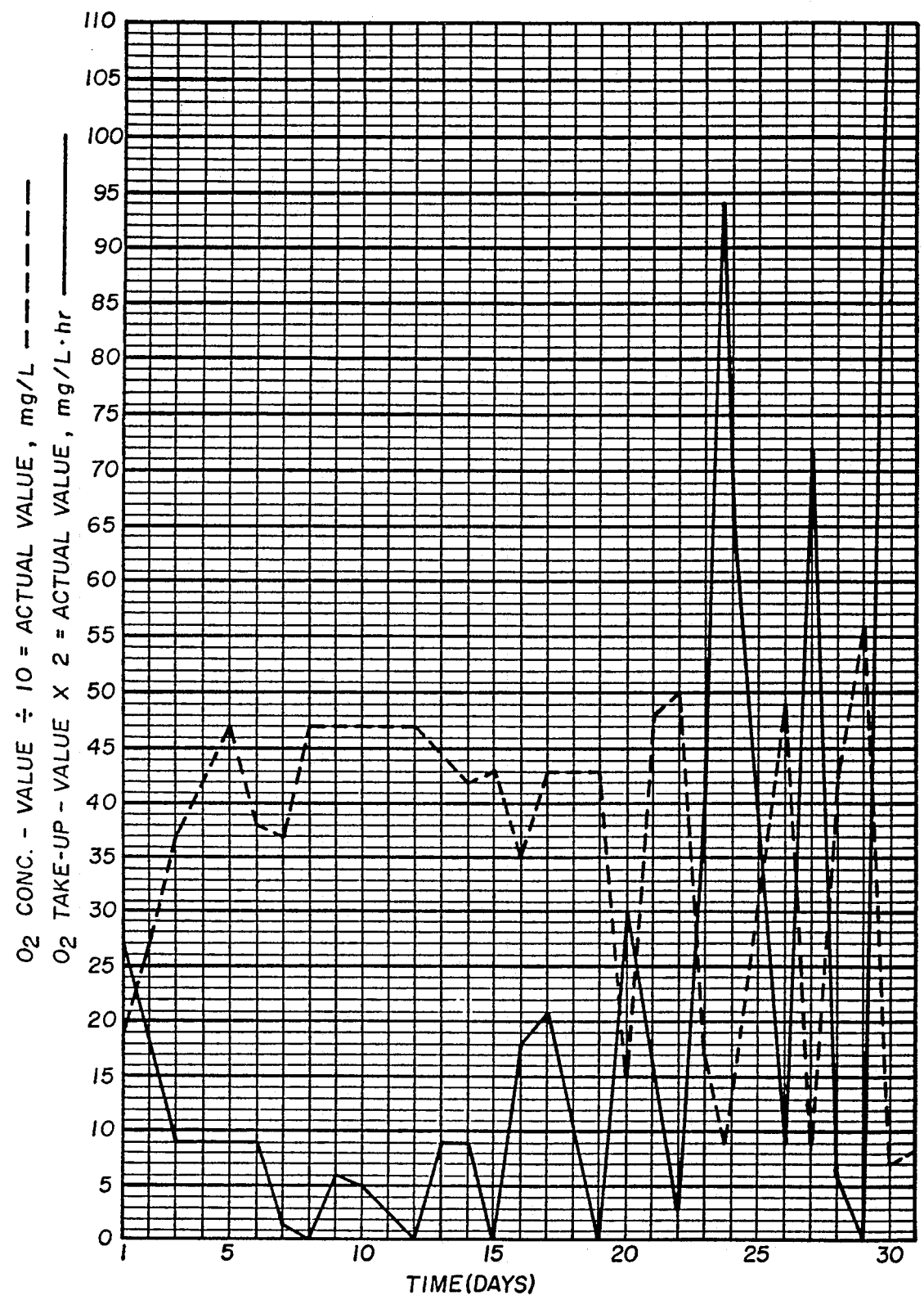
FIG. 32 is a graph illustrating the oxygen concentration (actual value divided by 10) and the oxygen take-up rate (actual value multiplied by 2) of the secondary reactor vessel of an experimental trial of the apparatus and process of the invention.
Figure 33:
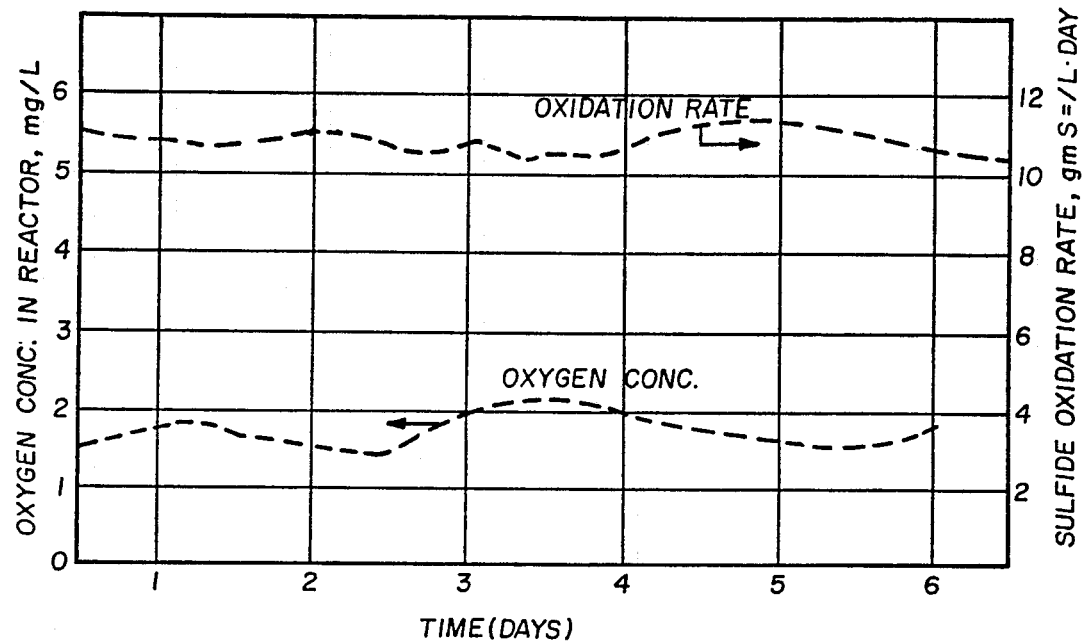
FIG. 33 is a graph illustrating the desired relationship of oxygen concentration and sulfide oxidation rate in a reactor vessel of the invention.
Figure 34:
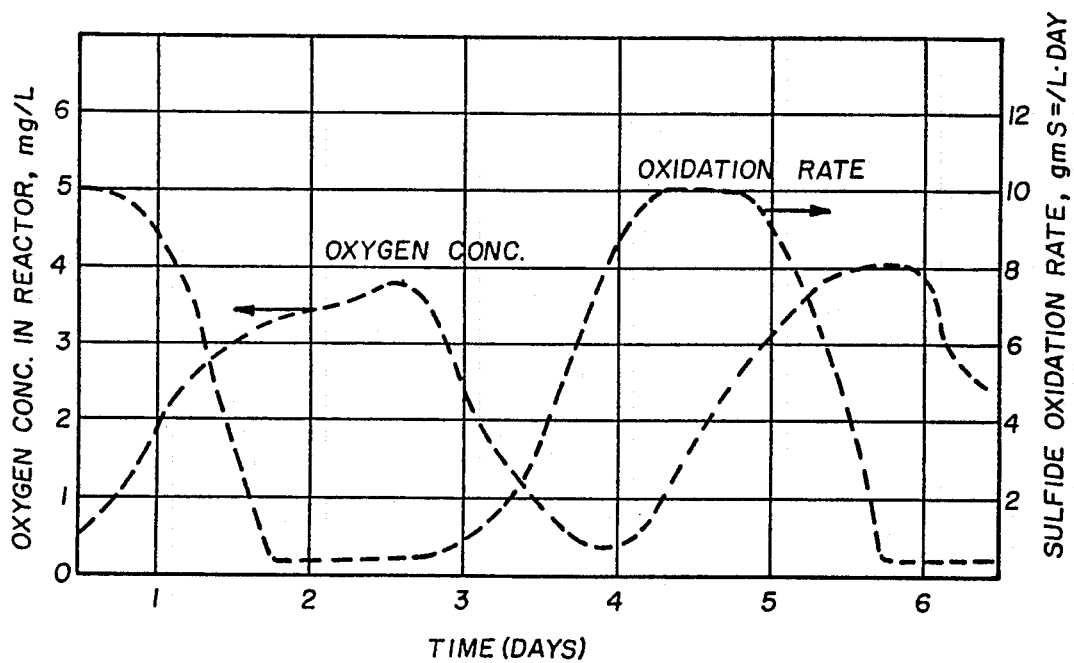
FIG. 34 is a graph illustrating an undesired relationship of oxygen concentration and sulfide oxidation rate in a reactor vessel of the invention.
Figure 35:
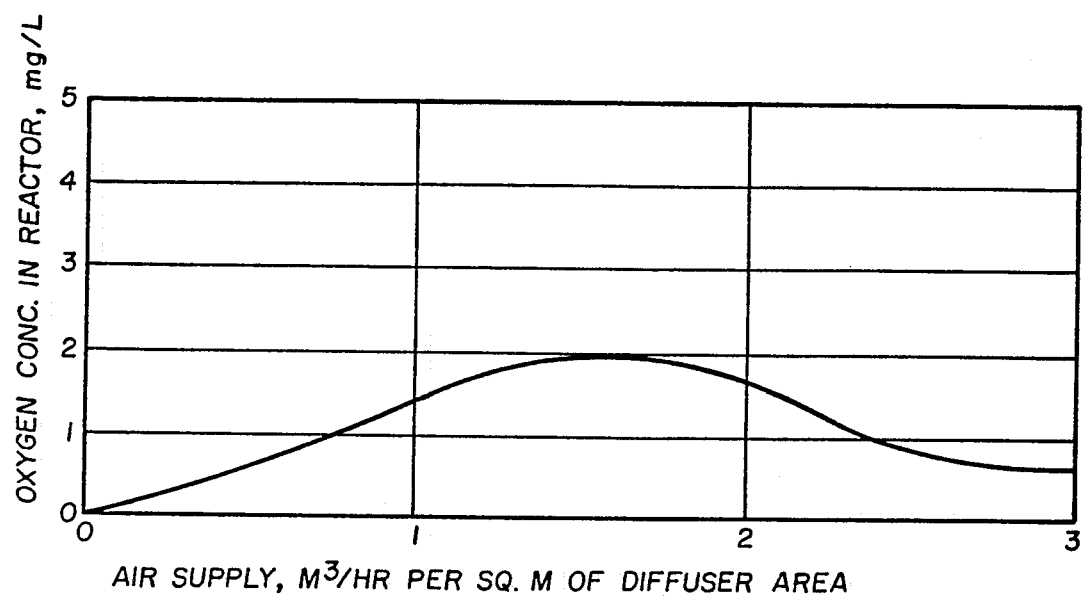
FIG. 35 is a graph illustrating the efficiency of oxygen transfer rate for a diffuser of this invention.

FIGS. 31 and 32 contain additional data collected on a daily basis on the oxygen levels and oxygen take-up rates measured in the bioreactors. In FIG. 32, the periodic very rapid increases in take-up over a hour period are worth noting. This suggests that there is a certain level of dormancy that occurs when insufficient food material is present. Maintaining an excess of food material should ensure continued oxidation rates much higher than those that were actually measured. It also indicates that the system can emerge quickly from dormant periods and return to full activity shortly after unoxidized material is added to the system.

CYANIDATION TESTS

Four samples were withdrawn by cycloning of the material in the second stage reactor, with the overflow thickened and washed prior to cyanidation. The cyanide strength was maintained at an average of about 3 gpl NaCN and the total leaching time was 72 hours. It was stimated that the weight of the concentrate has been reduced by approximately 72%, based on the relative increase in the insoluble content, and the gold concentration increased proportionally. The solutions that were withdrawn from the bioreactors were analyzed by fire assaying and found to contain virtually no gold. Thus, no loss of gold is expected during bioleaching, and the subsequent cyanidation recovered about 97% of the amount present.

The bioleaching test work carried out on the concentrate sample proved that the material can be processed with a continuous, 2-reactor system in which arsenic is extracted in the first unit and sulfide mainly in the second. The cyanidation of the oxidized product was very successful, with an average 97% recovery of gold values.

We claim:

1. A reactor for use in processing metal-ladened solids through use of a bioleaching process, said reactor comprising:
   - a containment means, having a base member, for containing a metal-bearing solids slurry;
   - a frame stationarily mounted within said containment means having an open lattice configuration;
   - an oxygen supply means for introducing oxygen-containing gas into said solids slurry, said supply means including a plurality of porous, flexible membrane diffusers mounted horizontally and spacedly on said frame, each said porous, flexible membrane diffuser being adapted to receive a supply of oxygen-containing gas and introducing said gas into said slurry in the form of bubbles; and
   - a sweeping means, mounted within said containment means below said frame for sweeping said base member of solids which have settled on said base member from said slurry.

2. The reactor of claim 1 wherein said frame support is oriented horizontally and positioned above said base member.

3. The reactor of claim 1 wherein each said diffuser has a substantially planar diffusing face.

4. The reactor of claim 1 wherein each said diffuser is elongate and tubular shaped.

5. The reactor of claim 1 wherein each said diffuser includes a plurality of elongate, tubular shaped members, each said member having a porous, flexible member exterior surface.

6. A reactor for use in processing metal-ladened solids through use of a bioleaching process, said reactor comprising:
   - a containment means, having a base member, for containing a metal-bearing solids slurry;
   - a frame stationarily mounted within said containment means, above said base member, said frame having an open lattice configuration;
   - a plurality of flexible porous membrane diffusers spacedly mounted on said frame, each said diffuser having a horizontally oriented diffuser face for introducing oxygen-containing gas, in the form of bubbles, into said slurry;
   - a supply means mounted on said diffusers for supplying oxygen-containing gas to said diffusers;
   - an upright rotatable center shaft rotatably mounted within said containment means; and
   - a plurality of rake-fitted arms mounted on said center shaft to be rotatable therewith, said rakes being positioned below said support frame and proximate said base member, wherein a rotation of said center shaft effects a raking action by said rakes over said base member to sweep solids which have settled on said base member from said solids slurry.

7. The reactor of claim 6 wherein said center shaft is fitted with an air lift means, said rake-fitted arms being oriented to direct solids swept thereby into said air lift means whereby said solids are removed from said base member via said air lift means and transported above said slurry and poured out on said slurry.

8. The reactor of claim 6 wherein said center shaft defines a hollow elongate channel therein which communicates with said slurry proximate said base member, said center shaft having a diffuser positioned within said channel for introducing a quantity of air into slurry residing within said channel; said center shaft further including a plurality of arms mounted above a surface level of said slurry, said arms communicating with said channel, wherein slurry lifted through said center shaft may be directed through said arms and poured through said arms onto said slurry surface.

9. A reactor for use in processing metal-ladened solids through use of a bioleaching process, said reactor comprising:
   - a containment means, having a base member, for containing a metal-bearing solids slurry;
   - an upright rotatable center shaft rotatably mounted within said containment means;
   - a plurality of radial arms mounted on said center shaft, above said base member;
   - a frame support stationarily mounted within said containment means elevationally above said radial arms, said frame having an open lattice configuration;
   - a plurality of flexible porous membrane diffusers spacedly mounted on said frame, each said diffuser having a horizontally oriented diffuser face for introducing oxygen-containing gas, in the form of bubbles, into said slurry;
   - a supply means mounted on said diffusers for supplying oxygen-containing gas to said diffusers; and
   - a plurality of rake-like members mounted on said radial arms to be rotatable therewith, said rakes being positioned below said diffusers and proximate said base member, wherein a rotation of said center shaft effects a raking action by said rake members over said base member to sweep solids which have settled on said base member from said solids slurry.

10. The reactor of claim 9 wherein said center shaft is fitted with an air lift means, said rake-fitted arms being oriented to direct solids swept thereby into said air lift means whereby said solids are removed from said base member via said air lift means and transported above said slurry and poured out on said slurry.

11. The reactor of claim 10 wherein said center shaft defines a hollow elongate channel therein which communicates with said slurry proximate said base member, said center shaft having a diffuser positioned within said channel for introducing a quantity of air into slurry residing within said channel; said center shaft further including a plurality of arms mounted above a surface level of said slurry, said arms communicating with said channel, wherein slurry lifted through said center shaft may be directed through said arms and poured through said arms onto said slurry surface.

* * * * *